(12) United States Patent
Sato et al.

(10) Patent No.: US 11,137,360 B2
(45) Date of Patent: Oct. 5, 2021

(54) X-RAY SPECTROMETER AND CHEMICAL STATE ANALYSIS METHOD USING THE SAME

(71) Applicant: SHIMADZU CORPORATION, Kyoto (JP)

(72) Inventors: Kenji Sato, Kyoto (JP); Tetsuya Yoneda, Kyoto (JP); Susumu Adachi, Kyoto (JP); Satoshi Tokuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/651,115

(22) PCT Filed: Jul. 25, 2018

(86) PCT No.: PCT/JP2018/027993
§ 371 (c)(1),
(2) Date: Mar. 26, 2020

(87) PCT Pub. No.: WO2019/064868
PCT Pub. Date: Apr. 4, 2019

(65) Prior Publication Data
US 2020/0225173 A1 Jul. 16, 2020

(30) Foreign Application Priority Data

Sep. 27, 2017 (WO) ............... PCT/JP2017/034860

(51) Int. Cl.
*G01N 23/207* (2018.01)
*G01N 23/2209* (2018.01)
*G01N 23/223* (2006.01)

(52) U.S. Cl.
CPC ....... *G01N 23/2076* (2013.01); *G01N 23/223* (2013.01); *G01N 23/2209* (2018.02);
(Continued)

(58) Field of Classification Search
None
See application file for complete search history.

(56) References Cited

U.S. PATENT DOCUMENTS

| 3,663,812 A * | 5/1972 | Koenig | G01N 23/2076 |
| | | | 378/49 |
| 4,362,935 A * | 12/1982 | Clark, III | G01N 23/223 |
| | | | 378/48 |

(Continued)

FOREIGN PATENT DOCUMENTS

| CN | 101566591 A | 10/2009 |
| CN | 104076050 A | 10/2014 |

(Continued)

OTHER PUBLICATIONS

Communication dated Apr. 16, 2020, from the European Patent Office in application No. 17909827.2.
(Continued)

*Primary Examiner* — Thomas R Artman
(74) *Attorney, Agent, or Firm* — Sughrue Mion, PLLC

(57) ABSTRACT

An X-ray spectrometer includes: an excitation source that irradiates a predetermined irradiation region on a surface of a sample with an excitation ray generating a characteristic X-ray; a flat plate analyzing crystal facing the irradiation region; a slit provided between the irradiation region and the analyzing crystal, the slit being parallel to a predetermined crystal plane of the analyzing crystal; a linear sensor including linear detection elements having a length in a direction parallel to the slit are arranged in a direction perpendicular to the slit; and an energy calibration unit that measures two characteristic X-rays in which energy is known by irradiating a surface of a standard sample generating the two characteristic X-rays with the excitation ray from the excitation source, and calibrates the energy of the characteristic (Continued)

X-ray detected by each detection element of the X-ray linear sensor based on the measured energies of the two characteristic X-rays.

16 Claims, 9 Drawing Sheets

(52) U.S. Cl.
CPC . *G01N 2223/076* (2013.01); *G01N 2223/303* (2013.01); *G01N 2223/3037* (2013.01); *G01N 2223/32* (2013.01); *G01N 2223/5015* (2013.01)

(56) References Cited

U.S. PATENT DOCUMENTS

| | | | |
|---|---|---|---|
| 4,852,135 A | | 7/1989 | Anisovich et al. |
| 5,406,608 A | | 4/1995 | Yellepeddi et al. |
| 5,745,543 A | * | 4/1998 | De Bokx ............ G01N 23/2076 378/45 |
| 5,978,442 A | | 11/1999 | Kuwabara |
| 9,417,341 B2 | * | 8/2016 | Erko ...................... G21K 1/067 |
| 10,914,694 B2 | * | 2/2021 | Ullom ........................ G01T 1/36 |
| 2011/0268252 A1 | | 11/2011 | Ozawa et al. |
| 2014/0229118 A1 | | 8/2014 | Kinoshita |
| 2014/0284478 A1 | | 9/2014 | Sako et al. |
| 2014/0291518 A1 | | 10/2014 | Soejima |
| 2014/0314207 A1 | * | 10/2014 | Erko ...................... G21K 1/067 378/82 |
| 2017/0160213 A1 | | 6/2017 | Sato et al. |
| 2019/0064084 A1 | * | 2/2019 | Ullom ........................ G01T 1/36 |
| 2020/0225172 A1 | * | 7/2020 | Sato ..................... G01N 23/223 |
| 2020/0225173 A1 | * | 7/2020 | Sato ..................... G01N 23/2209 |
| 2020/0386696 A1 | * | 12/2020 | Sato ..................... G01N 23/223 |
| 2021/0003520 A1 | * | 1/2021 | Kinugasa |

FOREIGN PATENT DOCUMENTS

| | | | |
|---|---|---|---|
| CN | 106855523 A | | 6/2017 |
| DE | 1472229 A1 | | 4/1969 |
| DE | 19603000 A1 | * | 7/1997 ............... G21K 1/02 |
| DE | 102014205148 A1 | | 9/2014 |
| DE | 102016014213 A1 | | 7/2017 |
| EP | 3627146 A1 | | 3/2020 |
| JP | 382943 A | | 4/1991 |
| JP | 2002189004 A | | 7/2002 |
| JP | 200398126 A | | 4/2003 |
| JP | 2009264926 A | | 11/2009 |
| JP | 2013967570 A | | 5/2013 |
| JP | 2014209098 A | | 11/2014 |
| JP | 2017223638 A | | 12/2017 |
| SU | 868503 A1 | | 9/1981 |
| WO | 2016103834 A1 | | 6/2016 |
| WO | 2018211664 A1 | | 11/2018 |
| WO | 2019064360 A1 | | 4/2019 |

OTHER PUBLICATIONS

Kenji Sato et al., "Polychromatic simultaneous WDXRF for chemical state analysis using laboratory X-ray source", X-Ray Spectrometry, vol. 46, 2017, pp. 330-335 ( 6 pages total).

Written Opinion of the International Searching Authority dated Oct. 23, 2018, in International Application No. PCT/JP2018/027993.

Hisashi Hayashi, "Chemical State Analysis of Cr and Fe Compounds by a Laboratory-use High-Resolution X-Ray Spectrometer with Spherically-bent Crystal Analyzers", Japan Society for Analytical Chemistry, Mar. 31, 2015, vol. 46, pp. 187-201 ( 15 pages total).

I. Zaharieva et al., "Towards a comprehensive X-ray approach for studying the photosynthetic manganese complex—XANES,Kα/Kβ/Kβ-satellite emission lines, RIXS, and comparative computational approaches for selected model complexes", Journal of Physics: Conference Series, vol. 190, 2009 ( 6 pages total).

Kenji Sakurai et al., "Chemical characterization using relative intensity of manganese Kβ' and Kβ$_5$ X-ray fluorescence", Nuclear Instruments and Methods in Physics Research B, vol. 199, 2003, pp. 391-395 ( 5 pages total).

Written Opinion of the International Searching Authority dated Aug. 8, 2017, in International Application No. PCT/JP2017/018701.

Written Opinion of the International Searching Authority dated Dec. 26, 2017, in International Application No. PCT/JP2017/034860.

Communication dated Feb. 18, 2021 by the United States Patent and Trademark Office in U.S. Appl. No. 16/612,092.

* cited by examiner

X-RAY SPECTROMETER AND CHEMICAL STATE ANALYSIS METHOD USING THE SAME

CROSS REFERENCE TO RELATED APPLICATIONS

This application is a National Stage of International Application No. PCT/JP2018/027993 filed Jul. 25, 2018, claiming priority based on International Patent Application No. PCT/JP2017/034860 filed Sep. 27, 2017.

TECHNICAL FIELD

The present invention relates to an X-ray spectrometer that spectrally disperses a characteristic X-ray emitted from a sample irradiated with an excitation ray such as a primary X-ray or an electron beam and detects the characteristic X-rays at each wavelength. The present invention also relates to a chemical state analysis method using such an X-ray spectrometer.

BACKGROUND ART

The characteristic X-ray emitted from a sample irradiated with the excitation ray has energy (wavelength) determined by an element contained in the sample. For this reason, a composition of the sample can be determined by detecting the characteristic X-ray.

Patent Literature 1 discloses an X-ray spectrometer 90 including an excitation source 91 that irradiates a predetermined irradiation region A on a surface of a sample S with an excitation ray in order to generate a characteristic X-ray, an analyzing crystal 93 provided to face the irradiation region A, a slit 92 provided between the irradiation region A and the analyzing crystal 93 so as to be parallel to the irradiation region A and a predetermined crystal plane of the analyzing crystal 93, and an X-ray linear sensor 94 provided such that a plurality of linear detection elements 941 each having a length in a direction parallel to the slit 92 are arranged in a direction perpendicular to the slit 92 (see FIGS. 16A and 16B).

In the X-ray spectrometer 90, when the irradiation region A is irradiated with the excitation ray, the characteristic X-ray is emitted in various directions from various positions in the irradiation region A, and only the characteristic X-ray passing through the slit 92 reaches the analyzing crystal 93. Considering an X-ray having specific energy (wavelength), only a part of the X-ray emitted from one of a plurality of linearly divided portions (A1, A2, . . . in FIGS. 16A and 16B) of the irradiation region A each parallel to the slit goes through the slit 92, is diffracted on the predetermined crystal plane of the analyzing crystal by satisfying a diffraction condition, and is detected by one of the linear detection elements 941 of the X-ray linear sensor 94. As such, X-rays having different energies emitted from different linear portions are diffracted by the predetermined crystal plane of the analyzing crystal through the slit 92, and detected by different detection elements 941. Thus, by detecting the position of the peak appearing on the X-ray linear sensor 94, the energy of the characteristic X-ray emitted from the irradiation region A can be determined to analyze the element of the sample. The X-ray spectrometer 90 can analyze a sample, such as a liquid or a powder, in which the composition is uniform regardless of the position, or a sample which is uniform among the linear portions if every linear portion is averaged even if the entire irradiation region A is non-uniform.

The energy of the characteristic X-ray slightly changes depending on a state of an electron orbit of the element contained in the sample, so that the measurement of the energy of the characteristic X-ray can analyze the chemical state, such as a valence and a bonding state which affects the electron orbit. Patent Literature 1 describes a method for analyzing the valence of the element contained in the sample using the X-ray spectrometer. Specifically, the energy of the characteristic X-ray varies from several hundred millielectron volts to several electron volts depending on a difference in the valence of the element (the difference is substantially smaller than the difference in the energy of the characteristic X-ray due to the difference of the element), so that the valence of the element can be known by precisely measuring the energy of the characteristic X-ray. By the method, the valence can be analyzed in real time without destroying the sample. For example, the analysis of the chemical state can be used for analyses such as degradation of the material due to a chemical change, a change of a state of a battery material due to charge or discharge, and identification of a harmful element (for example, hexavalent chromium) based on the difference in the valence.

CITATION LIST

Patent Literature

Patent Literature 1: US 2017/0160213 A

SUMMARY OF INVENTION

Technical Problem

In order to accurately detect the valence of the element in the device of Patent Literature 1, it is necessary to accurately measure the energy of the characteristic X-ray observed by the X-ray linear sensor. The problem to be solved by the present invention is to provide an X-ray spectrometer capable of accurately measuring the energy of the detected characteristic X-ray, and a method capable of accurately observing the chemical state such as the valence of the element contained in the sample using the X-ray spectrometer.

Solution to Problem

According to a first aspect of an X-ray spectrometer of the present invention, an X-ray spectrometer includes:

a) a sample holder;

b) an excitation source configured to irradiate a predetermined irradiation region on a surface of a sample held by the sample holder with an excitation ray for generating a characteristic X-ray:

c) an analyzing crystal provided to face the irradiation region;

d) a slit provided between the irradiation region and the analyzing crystal, the slit being parallel to the irradiation region and a predetermined crystal plane of the analyzing crystal;

e) an X-ray linear sensor provided such that a plurality of linear detection elements each having a length in a direction parallel to the slit are arranged in a direction perpendicular to the slit; and f) an energy calibration unit configured to calibrate energy of the characteristic X-ray detected by each of the plurality of detection elements of the X-ray linear sensor based on known energies of two characteristic X-rays measured by irradiating the irradiation region on a surface of a standard sample held by the sample holder with the excitation ray from the excitation source.

During use of the X-ray spectrometer of the first aspect, the energy calibration unit calibrates the energy of the characteristic X-ray detected by each of the detection elements of the X-ray linear sensor using the standard sample. The calibration may be performed immediately before a measurement every time a sample of the analysis target is measured, or periodically performed regardless of a measurement of a sample.

The standard sample used here is one such that generates two (or more) characteristic X-rays having known energies by being irradiated with the excitation ray from the excitation source. Specifically, when the standard sample contains only one kind of element having known valence, the energies of the two characteristic X-rays of the element may be used for the calibration. When the standard sample contains two (or more) kinds of elements having known valences, the energy of at least one characteristic X-ray of each element may be used for the calibration.

The energy calibration unit can use one of the following two methods for the calibration of the energy of the characteristic X-ray detected by each of the plurality of detection elements of the X-ray linear sensor. In the first method, the position of the X-ray linear sensor is moved such that two (or more) kinds of characteristic X-rays having different energies are incident on predetermined detection elements. In the second method, the position of the X-ray linear sensor is not moved, but a calibration curve indicating a relationship between the detection elements and the energy is created based on the position of the detection element on which at least two kinds of characteristic X-rays are incident.

Using the two characteristic X-rays having different energies emitted from the standard sample, the energy calibration unit calibrates the energy of the characteristic X-ray detected by each of the detection elements of the X-ray linear sensor, which allows the X-ray linear sensor to accurately determine the energy of characteristic X-rays emitted from the sample of the analysis target when the sample is analyzed. Consequently, the chemical state such as the valence of the element contained in the sample of the analysis target can be accurately observed.

It is preferable that two (or more) characteristic X-rays emitted from one kind of element in a standard sample is used as the two characteristic X-rays (calibration characteristic X-rays). In this case, it is not necessary to mix two or more kinds of elements in preparing a standard sample. Preferably, the two characteristic X-rays are set to be $K\alpha_1$ and $K\beta_{1,3}$ considering the intensities. The one kind of element is preferred to be chosen from elements contained in a sample of a measurement target.

It is also preferable that $K\alpha_1$ rays emitted respectively from at least two kinds of elements are used as the two characteristic X-rays (calibration characteristic X-rays) generated from the standard sample. $K\alpha_1$ rays normally have higher intensity than other characteristic X-rays, so that the energy can accurately be calibrated using $K\alpha_1$ rays.

When $K\alpha_1$ rays are used as the calibration characteristic X-rays, preferably, the two kinds of elements are set to be an element contained in a sample of a measurement target and another element having atomic number larger than the element by one, or an element having atomic number larger than an element contained in the sample of the measurement target by one and another element having atomic number larger than the element contained in the sample of the measurement target by two. This is because, in analyzing valence of an element of an analysis target, $K\beta_{1,3}$ ray and $K\beta'$ ray having energy close to $K\beta_{1,3}$ ray emitted from the element are usually detected, and $K\alpha_1$ ray emitted from an element having atomic number larger than the element of the analysis target by one (and two) generally has energy close to $K\beta_{1,3}$ and $K\beta'$ rays of the element of the analysis target. Thus, $K\alpha_1$ ray contributes to an accurate observation of the energy of $K\beta_{1,3}$ ray and $K\beta'$ ray of the element of the analysis target.

Alternatively, when elements contained in the sample of the measurement target are two or more kinds of elements having consecutive atomic numbers, preferably the two characteristic X-rays generated from the standard sample are $K\alpha_1$ ray of an element having atomic number larger than the element having the largest atomic number in the elements contained in the sample of the measurement target by one and $K\alpha_1$ ray of one of the elements contained in the sample of the measurement target.

When $K\alpha_1$ ray emitted from a standard sample is detected as at least one of the calibration characteristic X-rays, $K\alpha_1$ ray and $K\alpha_2$ ray are detected by the X-ray linear sensor while partially overlapping each other. In this case, the intensities of $K\alpha_1$ ray and $K\alpha_2$ ray can be approximated using Lorentz functions in which energy is used as a variable. Thus, preferably, the energy calibration unit determines the peak energy (the energy at which the intensity reaches the peak) of intensity of $K\alpha_1$ ray by fitting the intensity curve observed by a plurality of detection elements of the X-ray linear sensor, in which $K\alpha_1$ ray and $K\alpha_2$ ray overlap, with a Lorentz function of $K\alpha_1$ ray and a Lorentz function of $K\alpha_2$ ray.

When the fitting is done with the Lorentz function of $K\alpha_1$ ray and the Lorentz function of $K\alpha_2$ ray, preferably the X-ray spectrometer has energy resolution in which the intensity at a valley formed between the peak of $K\alpha_1$ ray and the peak of $K\alpha_2$ ray becomes less than or equal to ½ of the intensity of the peak of $K\alpha_1$ ray. Consequently, the peak of $K\alpha_1$ ray and the peak of $K\alpha_2$ ray can be separated from each other more clearly.

When $K\beta_{1,3}$ ray is used as one of the calibration characteristic X-rays, $K\beta_{1,3}$ ray and $K\beta'$ ray are observed by the X-ray linear sensor while overlapping each other. In this case, similarly to $K\alpha_1$ ray, preferably the energy calibration unit determines the peak energy of the intensity of $K\alpha_{1,3}$ ray by fitting the intensity curve, in which $K\beta_{1,3}$ ray and $K\beta'$ ray observed by the X-ray linear sensor overlap, with a Lorentz function of $K\beta_{1,3}$ ray and a Lorentz function of $K\beta'$ ray.

Similarly to the characteristic X-ray obtained from the standard sample used for the energy calibration, the fitting with the Lorentz functions of $K\alpha_1$ ray and $K\alpha_2$ ray and the Lorentz functions of $K\beta_{1,3}$ ray and $K\beta'$ ray may be used on the characteristic X-rays observed from the sample of the measurement target. The fitting with the Lorentz function of the characteristic X-ray observed from the sample of the measurement target can also be used in an X-ray spectrometer that does not perform the energy calibration.

The X-ray spectrometer may further include a standard curve creation unit configured to create a standard curve indicating the relationship between peak energy and valence based on peak energy of the characteristic X-rays emitted from a plurality of standard samples containing predetermined known elements and known different valences. With this configuration, a standard valence of the predetermined element contained in the sample of the measurement target can be estimated by applying the peak energy of the characteristic X-ray emitted from the sample of the measurement target to the standard curve created by the standard curve creation unit.

In the X-ray spectrometer, the energy calibration unit may obtain, by a least square method, an optical path length between a reference detection element which is one of the plurality of detection elements and the slit and an inclination angle of the analyzing crystal, the inclination angle being defined by a diffraction angle of the characteristic X-ray that is Bragg-reflected by the analyzing crystal through the slit and is incident on a reference detection element, based on known energies of at least three characteristic X-rays measured by irradiating the irradiation region on a surface of the standard sample held by the sample holder with the excitation ray from the excitation source, and obtain the energy of the characteristic X-ray detected by each of the plurality of detection elements based on the optical path length, the inclination angle, and a distance between each of the plurality of detection elements of the X-ray linear sensor and the reference detection element.

In this way, the two values of the optical path length and the inclination angle are obtained by the least square method based on the energies of the at least three characteristic X-rays obtained from the standard sample, so that calculation accuracy of the two values is enhanced, and the energy of the characteristic X-ray detected by each of the plurality of detection element can be accurately determined.

In the X-ray spectrometer, the sample holder may include:

a measurement sample holder configured to hold a sample of a measurement target in a region including the irradiation region; and a standard sample holder configured to hold the standard sample at a position except for the measurement sample holder and a position irradiated with the excitation ray and within a range having a width in a direction perpendicular to the slit.

The sample holder has both the measurement sample holder and the standard sample holder, which allows the X-ray linear sensor to simultaneously detect both the characteristic X-ray generated from the sample of the measurement target and the characteristic X-ray generated from the standard sample. Consequently, whenever the characteristic X-ray from the sample of the measurement target are measured, the energy of the characteristic X-rays detected by each of the detection elements of the X-ray linear sensor can be calibrated using the characteristic X-ray from the standard sample obtained at the same time as the characteristic X-ray from the sample of the measurement target are measured.

The calibration of the energy at any time in this way can suitably be used when the change in the energy of the characteristic X-ray detected by each detection element is calibrated, the change in the energy of the characteristic X-ray being generated by expansion or contraction of the X-ray linear sensor and the analyzing crystal or a change of a positional relationship between the X-ray linear sensor and the analyzing crystal due to the change in the temperature inside the X-ray spectrometer changes over time. On the other hand, the calibration of the characteristic X-ray energy required due to the temperature change in the X-ray spectrometer can also be performed by an X-ray spectrometer according to a second aspect.

According to a second aspect of an X-ray spectrometer of the present invention, an X-ray spectrometer that performs spectroscopic analysis of a characteristic X-ray generated from a sample, includes:

a) a sample holder;

b) an excitation source configured to irradiate a predetermined irradiation region on a surface of a sample held by the sample holder with an excitation ray for generating a characteristic X-ray;

c) an analyzing crystal provided to face the irradiation region;

d) a slit provided between the irradiation region and the analyzing crystal, the slit being parallel to the irradiation region and a predetermined crystal plane of the analyzing crystal;

e) an X-ray linear sensor provided such that a plurality of linear detection elements each having a length in a direction parallel to the slit are arranged in a direction perpendicular to the slit;

f) a temperature measurement unit configured to measure a temperature at a predetermined position in the X-ray spectrometer; and g) an energy calibration unit configured to calibrate energy of a characteristic X-ray detected by each of the plurality of detection elements using the temperature measured by the temperature measurement unit based on a previously-obtained relationship between the temperature at the predetermined position and the energy of the characteristic X-ray detected by each of the plurality of detection elements.

In the X-ray spectrometer of the second aspect, the temperature at a predetermined position in the X-ray spectrometer is measured by the temperature measurement unit, and the energy of the characteristic X-ray detected by each of the plurality of detection elements can be calibrated using the measurement result. Thus, it is not necessary to perform the measurement using the standard sample, and the calibration can be performed as needed every time the characteristic X-ray from the sample of the measurement target is measured.

The predetermined position can be set, for example, to a position of the analyzing crystal or the X-ray linear sensor or a position in a vicinity of the analyzing crystal or the X-ray linear sensor. Alternatively, when the components of the slit, the analyzing crystal, and the X-ray linear sensor are accommodated in a chassis while the components are fixed to a wall of the chassis, the chassis or the vicinity of the chassis may be set to the predetermined position. In this case, even when the chassis expands or contracts with a change in temperature to change a positional relationship between the elements, and therefore even when the energy of the characteristic X-ray detected by each detection element changes, the energy of the characteristic X-ray can be calibrated.

According to a first aspect of a method of the present invention, a method for analyzing a chemical state of an element in a sample of a measurement target using the X-ray spectrometer of the first aspect, includes:

calibrating the energy of the characteristic X-ray detected by each of the plurality of detection elements of the X-ray linear sensor based on the energies of at least two characteristic X-rays having different energies generated by irradiating the surface of the standard sample held by the sample holder with the excitation ray from the excitation source; and determining the chemical state of the element in the sample of the measurement target based on the energy of the characteristic X-rays generated by irradiating the surface of the sample of the measurement target held by the sample holder with the excitation ray from the excitation source.

According to a second aspect of a method of the present invention, a method for analyzing a chemical state of an element in a sample of a measurement target using the X-ray spectrometer of the second aspect, includes:

calibrating the energy of the characteristic X-ray detected by each of the plurality of detection elements of the X-ray linear sensor using a temperature at the analyzing crystal measured by the temperature measurement unit and a temperature at the X-ray linear sensor based on a previously-obtained relationship among the temperature at the analyzing crystal, the temperature at the X-ray linear sensor, and the energy of the characteristic X-ray detected by each of the plurality of detection elements; and determining the chemical state of the element in the sample of the measurement target based on the energy of the characteristic X-ray generated by irradiating the surface of the sample of the measurement target held by the sample holder with the excitation ray from the excitation source.

In the chemical state analysis methods of the first and second aspects, the valence of the element in the sample of the measurement target can suitably be determined as the chemical state in the chemical state determining step.

Advantageous Effects of Invention

The X-ray spectrometer of the present invention can accurately obtain the energy of the detected characteristic X-ray.

The X-ray spectrometer of the present invention can accurately analyze the chemical state such as the valence of the element contained in the sample.

BRIEF DESCRIPTION OF DRAWINGS

FIG. 7A illustrates the case where the X-ray linear sensor moves in a direction in which the X-ray linear sensor approaches an analyzing crystal, FIG. 7B illustrates the case where the X-ray linear sensor moves in a direction in which the X-ray linear sensor separates from the analyzing crystal, and FIG. 7C illustrates a state after a distance to the analyzing crystal and a position in an arrangement direction of the detection elements are adjusted.

DESCRIPTION OF EMBODIMENTS

An X-ray spectrometer and a chemical state analysis method according to an exemplary embodiment of the present invention will be described with reference to FIGS. 1 to 15.

(1) Configuration of X-Ray Spectrometer of First Embodiment

Figure 1:
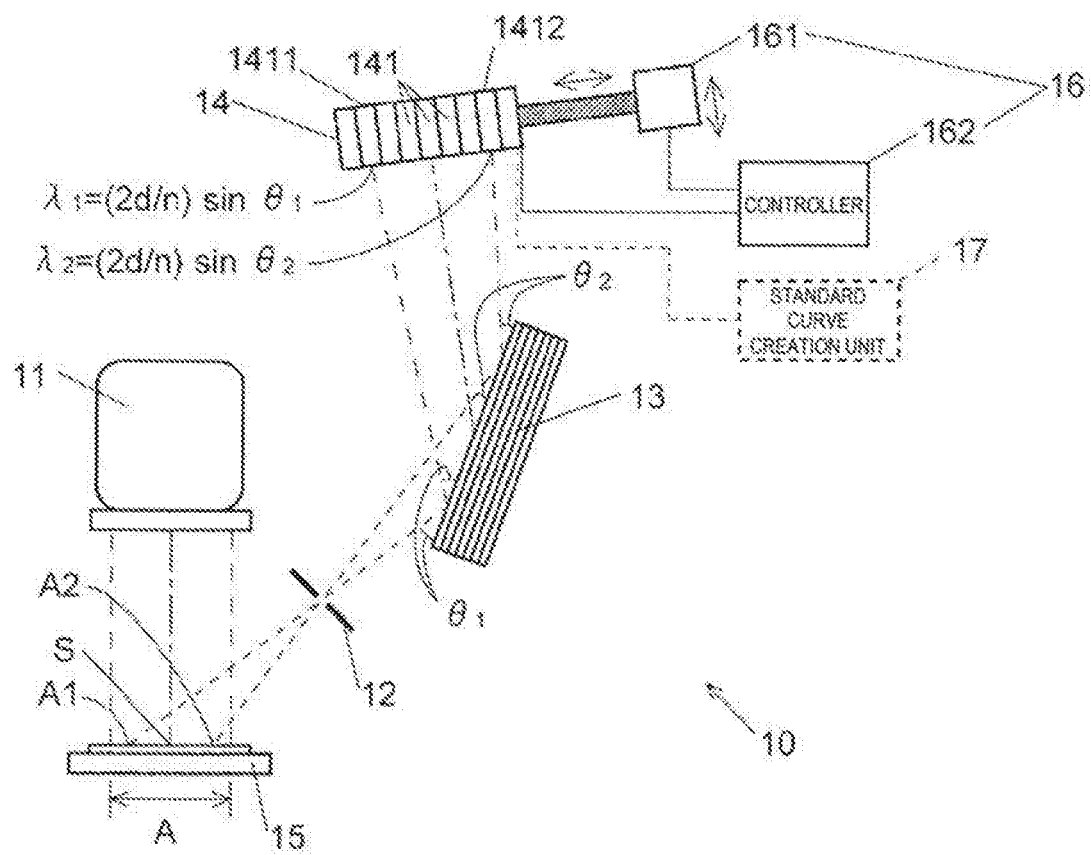
FIG. 1 is a schematic side view illustrating an X-ray spectrometer according to a first embodiment of the present invention.

FIG. 1 is a schematic side view illustrating an X-ray spectrometer 10 according to the first embodiment. This X-ray spectrometer 10 has an excitation source 11, a slit 12, an analyzing crystal 13, an X-ray linear sensor 14, a sample holder 15, and an energy calibration unit 16 (a standard curve creation unit 17 in FIG. 1 may not necessarily be included in the X-ray spectrometer 10, details of the standard curve creation unit 17 will be described later).

The excitation source 11 is an X-ray source that irradiates a sample S held by the sample holder 15 with an X-ray that is excitation light (excitation ray). An electron beam source may be used instead of the X-ray source. The excitation source 11 irradiates a planar irradiation region A on the sample S with the excitation light. In the first embodiment, the irradiation region A is perpendicularly irradiated with the excitation light. Alternatively, the irradiation region A may obliquely be irradiated with the excitation light.

The slit 12 is disposed between the irradiation region A and the analyzing crystal 13. In the first embodiment, the analyzing crystal 13 has a flat plate shape. A predetermined crystal plane of the analyzing crystal 13 is parallel to a surface of the analyzing crystal 13. The slit 12 is disposed in parallel to (perpendicular to paper in FIG. 1) the irradiation region A and the crystal plane (that is, the surface of the analyzing crystal 13) of the analyzing crystal 13 used to detect the characteristic X-ray (perpendicular to paper in FIG. 1).

In the X-ray linear sensor 14, a plurality of linear detection elements 141 having a length in a direction parallel to the slit 12 (perpendicular to the plane in FIG. 1) are arranged in a direction perpendicular to the slit 12. Each detection element 141 only needs to detect the intensity (number) of the X-ray incident on the detection element 141, and does not need a function of strictly detecting a wavelength and energy of the incident X-ray.

A state of the sample S may be any of a solid, a liquid, and a gas, and the sample holder 15 corresponding to the state of the sample is used. That is, a table on which the sample S is placed is used as the sample holder 15 when the sample S is a solid, a container that stores the sample S is used as the sample holder 15 when the sample S is a liquid, and a container that encloses the sample S is used as the sample holder 15 when the sample S is a gas.

The energy calibration unit 16 includes an X-ray linear sensor position fine adjustment unit 161 and a controller 162. The X-ray linear sensor position fine adjustment unit 161 moves the X-ray linear sensor 14 in the direction perpendicular to the direction in which the detection elements 141 are arranged and perpendicular to the length direction of the detection element 141 while moving the X-ray linear sensor 14 in the direction in which the detection elements 141 are arranged, thereby finely adjusting the position of the X-ray linear sensor 14. The controller 162 moves the position of the X-ray linear sensor 14 by controlling the X-ray linear sensor position fine adjustment unit 161 based on the measurement results of the two characteristic X-rays emitted by irradiating the surface of the standard sample with the excitation ray from the excitation source 1. Details of the control of the controller 162 will be described later.

(2) Operation of the X-Ray Spectrometer of First Embodiment

The operation of the X-ray spectrometer 10 of the first embodiment will be described below. For convenience, a method for measuring the characteristic X-ray emitted by irradiating the sample S of the measurement target with the excitation light and a method for determining the valence of the element contained in the sample S will be described, and then a method for calibrating the energy of the characteristic X-ray detected by each of the detection elements 141 using the standard sample will be described.

Figure 16A:
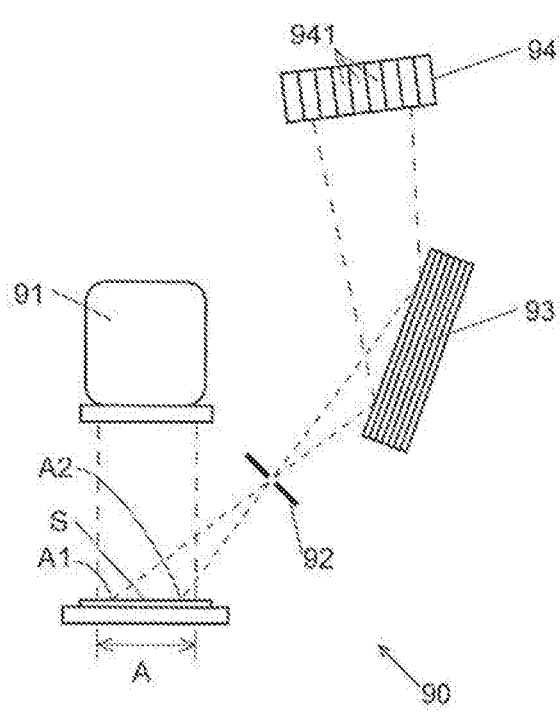
FIGS. 16A and 16B are a schematic side view FIG. 16A and a schematic perspective view FIG. 16B, respectively, illustrating an example of a conventional X-ray spectrometer.
Figure 16B:
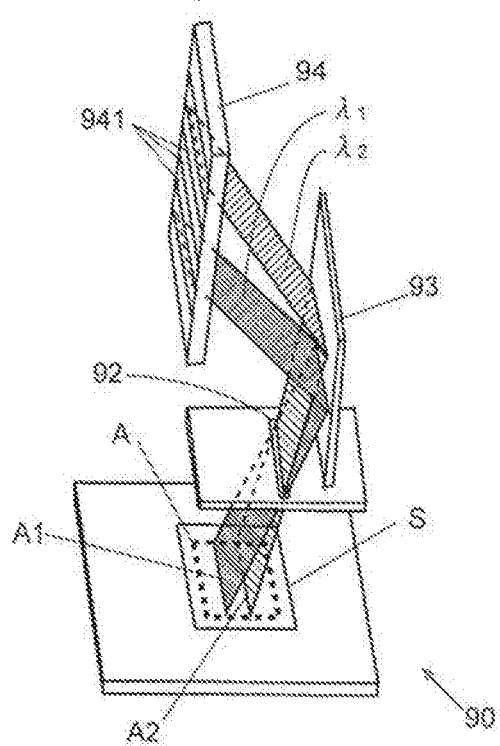

(2-1) Method for Measuring Characteristic X-Rays Emitted from Sample S of Measurement Target After the sample holder 15 holds the sample S, the excitation source 11 irradiates the irradiation region A on the surface of the sample S with the X-ray as the excitation light. Consequently, the characteristic X-rays having different energies depending on the elements constituting the sample S are emitted in various directions from various positions in the whole irradiation region A. As described above in the conventional X-ray spectrometer 90, when the irradiation region A is divided into the linear portions (see A1, A2 in FIGS. 16A and 16B) parallel to the slit 12, only the characteristic X-ray emitted in the direction in which the characteristic X-ray is incident on the surface of the analyzing crystal 13 at one specific incident angle $(90-\theta)°$ ($\theta$ is a diffraction angle when the characteristic X-ray is Bragg-reflected by the analyzing crystal 13) passes through the slit 12. The incident angles of characteristic X-rays incident on the analyzing crystal 13 through the slit 12 varies in the linear portions having different positions. For example, the characteristic X-ray emitted from a linear portion A1 in FIG. 1 is incident on the analyzing crystal 13 at only one incident angle $(90-\theta_1)°$ and the characteristic X-ray emitted from another linear portion A2 is incident on the analyzing crystal 13 at only one incident angle $(90-\theta_2)°$ different from the incident angle $(90-\theta_1)°$.

The characteristic X-ray incident on the analyzing crystal 13 from each linear portion of the irradiation region A is diffracted (reflected) at the diffraction angle $\theta$ only when the characteristic X-ray has a wavelength satisfying $\lambda=(2d/n) \sin \theta$ (where $\lambda$ is a wavelength of the characteristic X-ray, d is a crystal plane interval of the analyzing crystal 13, and n is a degree) that is a Bragg reflection condition. One of the detection elements 141 of the X-ray linear sensor 14 detects the characteristic X-ray diffracted (reflected) by the analyzing crystal 13. As described above, the characteristic X-ray is incident on the analyzing crystal 13 at one specific incident angle $(90-\theta)°$ that varies depending on the linear portion in the irradiation region A. Thus, in each linear portion, the characteristic X-rays having only specific one wavelength is incident on the X-ray linear sensor 14, and is detected by the different detection element 141. For example, for the characteristic X-ray emitted from the linear portion A1 in FIG. 1, only the characteristic X-ray having a wavelength $\lambda_1=(2d/n) \sin \theta_1$ is incident on the X-ray linear sensor 14 and is detected by one detection element 1411, For the characteristic X-rays emitted from the linear portion A2, only the characteristic X-ray having a wavelength $\lambda_2=(2d/n) \sin \theta_2$ different from the wavelength $\lambda_1$ is incident on the X-ray linear sensor 14 and is detected by a detection element 1412 different from the detection element 1411. Thus, a wavelength spectrum of the characteristic X-rays emitted from the irradiation region A can be obtained by detecting the intensity (number) of the incident X-rays for each detection element 141 of the X-ray linear sensor 14.

Figure 2:
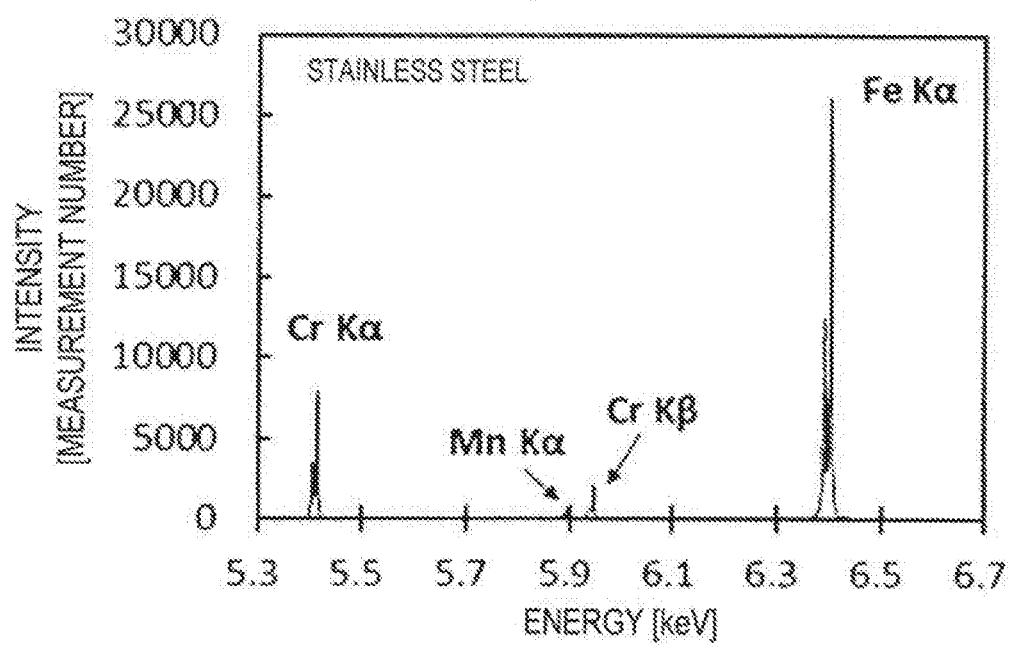
FIG. 2 is a graph illustrating an example of a characteristic X-ray wavelength spectrum obtained from a sample of a measurement target by the X-ray spectrometer of the present invention.
Figure 3:
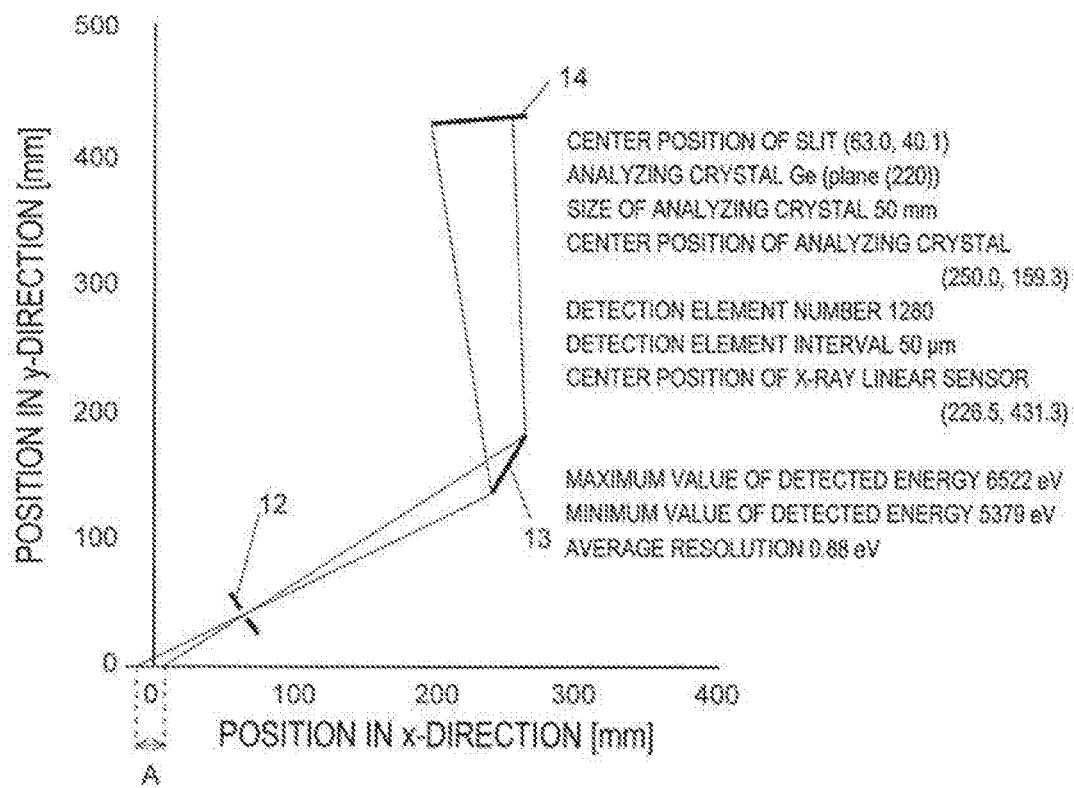
FIG. 3 is a schematic diagram illustrating dimensions of the X-ray spectrometer that performs the measurement in FIG. 2 and a layout of components.

FIG. 2 illustrates an example of obtained wavelength spectrum data. The data is measured using stainless steel as the sample S, and $K\alpha$ ray of Fe (iron), $K\alpha$ ray and $K\beta$ ray of Cr (chromium), and $K\alpha$ ray of Mn (manganese) are observed within a measured energy range. In $K\alpha$ ray of Fe, two peaks in which the intensity on the high energy side is about twice are observed. In the two peaks, the peak on the high energy side indicates $K\alpha_1$ ray, and the peak on the low energy side indicates $K\alpha_2$ ray. FIG. 3 illustrates dimensions of the X-ray spectrometer 10 that performs the measurement in FIG. 2 and a layout of the components.

Figure 4:
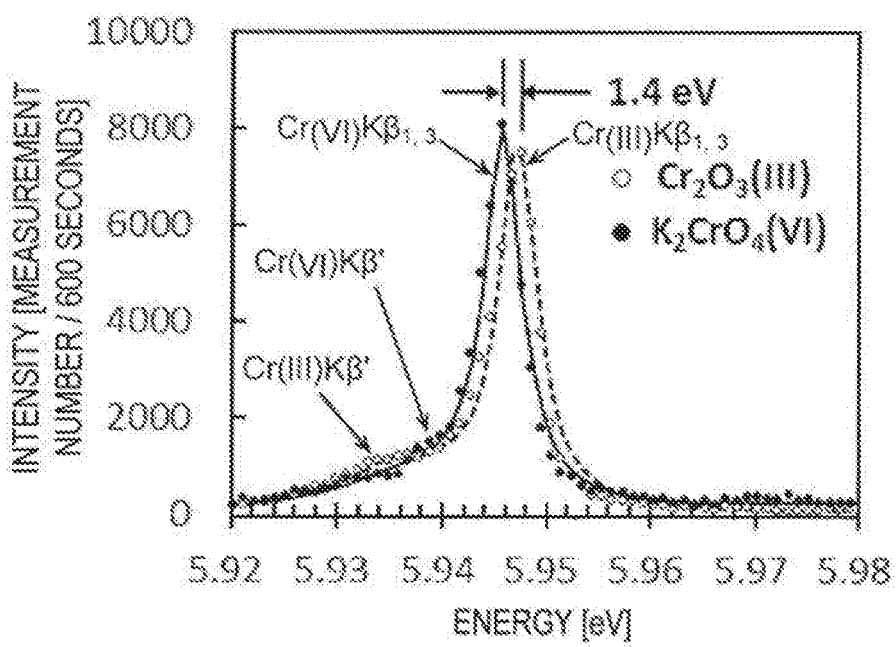
FIG. 4 is a graph illustrating a characteristic X-ray detection result obtained from the same element having different valences contained in the sample of the measurement target.

FIG. 4 illustrates an example in which the valence of Cr is determined based on $K\beta$ ray of Cr for $K_2CrO_4$ (a black circle in FIG. 4, +6 valences) and $Cr_2O_3$ (a white circle in FIG. 4, +3 valences) (the data in FIG. 4 is different from the data of $K\beta$ ray of Cr in FIG. 2). According to the data, $K\beta_{1,3}$ ray emitted from Cr having +3 valences has higher energy than $K\beta_{1,3}$ ray emitted from Cr having +6 valences by 1.4 eV. Whether Cr contained in the sample of the measurement target has +3 or +6 valences can be determined based on the difference in the energy. The valence of Cr contained in the sample of the measurement target can also be determined from the difference in the energy of $K\beta'$ ray appearing on the lower energy side than $K\beta_{1,3}$ ray.

(2-2) Design of Layout of Detection Elements of X-Ray Linear Sensor

A method for designing where to position each detection element 141 of the X-ray linear sensor 14 will be described with reference to FIG. 5. The X-ray linear sensor 14 is disposed such that in the characteristic X-rays incident on the analyzing crystal 13, the characteristic X-ray diffracted (ON is a diffraction angle) at a center $C_M$ of the analyzing crystal 13 in a section (the plane in FIG. 5) perpendicular to the length direction of the detection element 141 is incident on a detection element 141M in the center (N/2-th) of the X-ray linear sensor 14, and such that the characteristic X-ray having the longest wavelength (largest diffraction angle) is incident on a detection element 141L at one end (0-th) of the X-ray linear sensor 14. At this point, an inclination of the X-ray linear sensor 14 is adjusted such that the characteristic X-ray diffracted at the center $C_M$ of the analyzing crystal 13 is incident perpendicularly to the direction in which the detection elements 141 are arranged.

Figure 5:
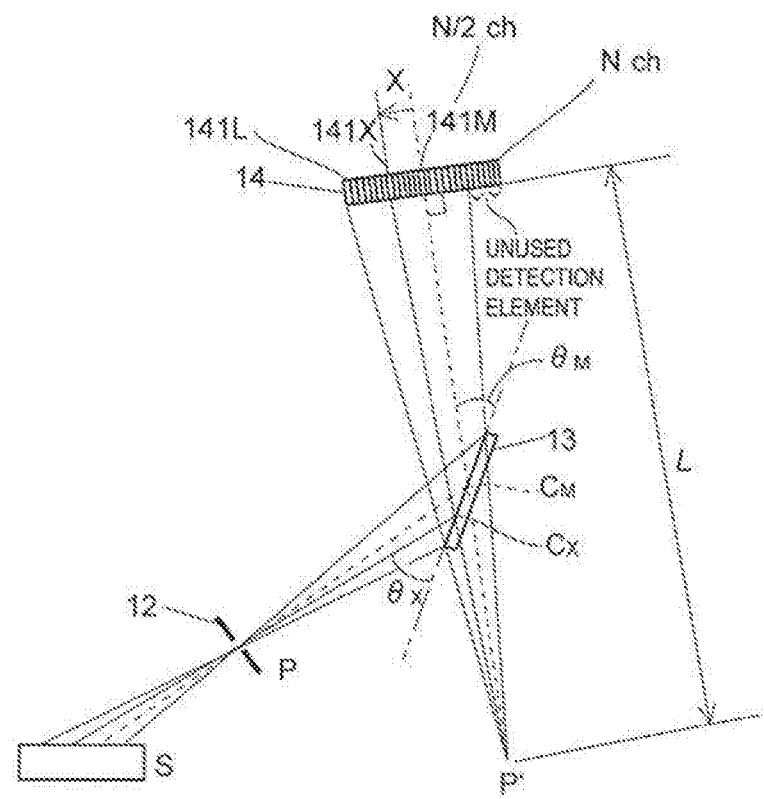
FIG. 5 is a view illustrating a method for designing the layout of an X-ray linear sensor in the X-ray spectrometer of the first embodiment.

All the optical paths of the diffracted light diffracted at the points on the surface of the analyzing crystal 13 on the plane in FIG. 5 intersect with a point P that is one point on the slit 12 in front of the analyzing crystal 13, and intersect with one point P' when All the optical paths extend to a back surface side of the analyzing crystal 13 (opposite side of the X-ray linear sensor 14), they intersect at one point P' (an isosceles triangle is formed when the point P, each point on the surface of the analyzing crystal 13, and the point P' are connected). It is assumed that L is a distance between the detection element 141M at the center of the X-ray linear sensor 14 and the point P'. The distance L is equal to an optical path length of the characteristic X-ray from the slit 12 to the X-ray linear sensor 14, the characteristic X-ray being diffracted at the center $C_M$ of the analyzing crystal 13 and being incident on the detection element 141M in the center of the X-ray linear sensor 14.

Assuming that n is a detection element number (channel number), that p is a detection element interval, and that N is the number of detection elements, a wavelength $\lambda_X$ of the characteristic X-ray incident on a detection element 141X apart from the center of the X-ray linear sensor 14 by a distance X (X=μ(n−N/2)) and a diffraction angle θx of the analyzing crystal 13 satisfy a relationship given by the following equation (1).

[Mathematical formula 1]

$$\tan\theta_X = \frac{\lambda_X}{\sqrt{4d^2 - \lambda_X^2}} \quad (1)$$

On the other hand, a relationship between distance X and distance L is given by the following equation (2),

[Mathematical formula 2]

$$\frac{X}{L} = \tan(\theta_M - \theta_X)$$
$$= \frac{\tan\theta_M - \tan\theta_X}{1 + \tan\theta_M \cdot \tan\theta_X} \quad (2)$$

From the equations (1) and (2), the wavelength $\lambda_X$ of the characteristic X-ray incident on the detection element 141X is given by the following equation.

[Mathematical formula 3]

$$\lambda_X = \frac{2d\,(L\cdot\sin\theta_M - X\cdot\cos\theta_M)}{\sqrt{X^2 + L^2}} \quad (3)$$

Figure 6:
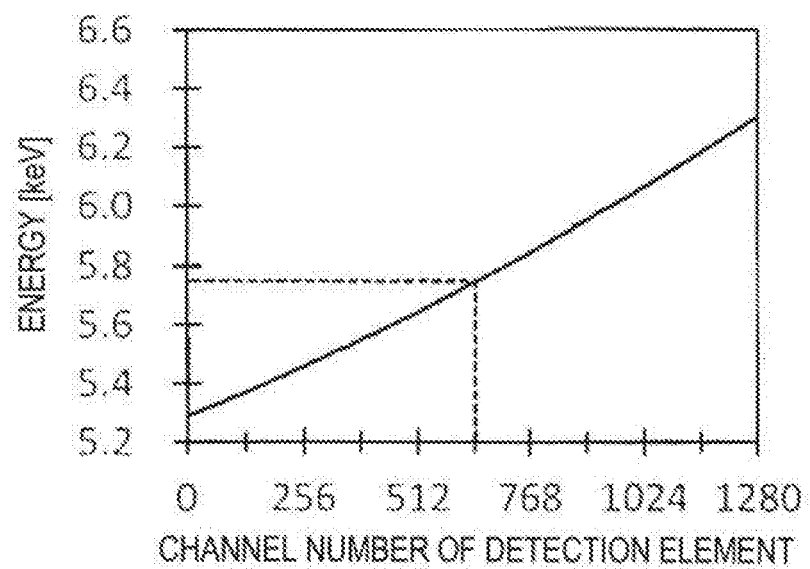
FIG. 6 is a graph illustrating an example of a relationship between each detection element of the X-ray linear sensor and detected energy.

From the equation (3), the position of the center of the X-ray linear sensor 14 is matched with the position on which the X-ray diffracted at the diffraction angle $\theta_M$ in the analyzing crystal is incident, and the value of the distance L is adjusted, so that the relationship between each detection element 141 and the energy of characteristic X-rays incident on detection element 141 can be determined. FIG. 6 illustrates an example in which the relationship between each detection element 141 and the energy of the characteristic X-ray is determined.

(2-3) Method for Calibrating Energy of Characteristic X-Ray Detected by Each Detection Element Ideally the X-ray linear sensor 14 is disposed as designed by the method described in the section (2-2), but actually, sometimes the X-ray linear sensor 14 is disposed while shifted from the position where the X-ray linear sensor 14 is designed, or the position is slightly shifted due to vibration during use even when the X-ray linear sensor 14 disposed once as designed. For this reason, in the first embodiment, the position of the X-ray linear sensor 14, namely, the energy (wavelength) detected by each detection element 141 is calibrated as described below. The standard sample used for the calibration is attached to the sample holder 15, and the irradiation region A on the surface of the standard sample is irradiated with the excitation light emitted from the excitation source 11. At this point, the standard sample that generates at least two characteristic X-rays having the known energies by irradiating the standard sample with the excitation light from the excitation source 11 is used. As long as the energy of the characteristic X-ray generated in this way is known, the element contained in the standard sample and the valence of the element does not have to be known.

Similarly to the measurement of the sample S, the X-ray linear sensor 14 detects only the characteristic X-ray diffracted by the analyzing crystal 13 through the slit 12 in the characteristic X-rays emitted from the standard sample by the irradiation of the excitation light. At this point, only characteristic X-ray having the specific energy that is emitted from the specific linear portion of the irradiation region A and determined by the incident angle on the analyzing crystal 13 is incident on each of the detection elements 141 of the X-ray linear sensor 14. In this case, because the standard sample is used, the X-ray linear sensor 14 detects the characteristic X-rays having two different energies (energy=peak energy when the detected intensity (number) is maximized) $E_1$ and $E_2$. The controller 162 controls the X-ray linear sensor position fine adjustment unit 161 to move the X-ray linear sensor 14 such that the two characteristic X-rays are incident on the predetermined detection elements 141 corresponding to the energies.

Figure 7A:
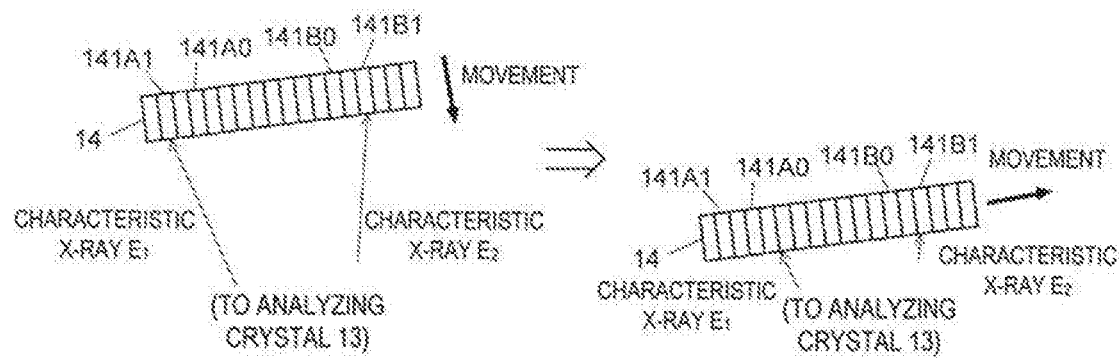
FIGS. 7A-7C are schematic diagrams illustrating a method of calibrating energy of the characteristic X-ray detected by each detection element of the X-ray linear sensor in the X-ray spectrometer of the first embodiment.
Figure 7B:
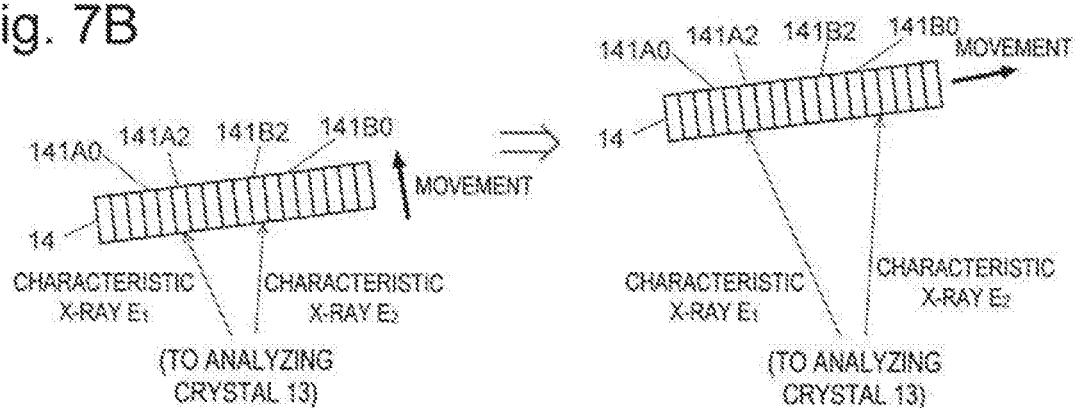
Figure 7C:
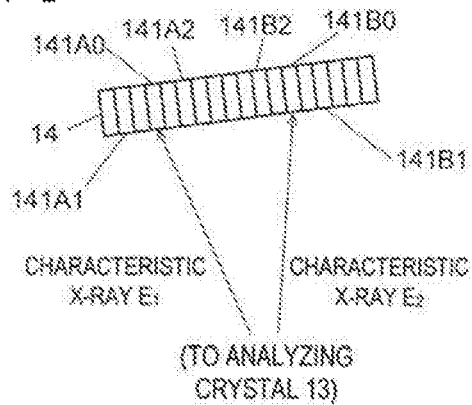

Specifically, when the two characteristic X-rays are incident on two detection elements 141A1, 141B1 having an interval larger than that between two predetermined detection elements 141A0, 141B0 on which the two characteristic X-rays are incident (FIG. 7A), the X-ray linear sensor 14 is moved in the direction in which the X-ray linear sensor 14 is brought close to the analyzing crystal 13. On the other hand, when the two characteristic X-rays are incident on two detection elements 141A2, 141B2 having an interval smaller than that between two predetermined detection elements 141A0, 141B0 on which the two characteristic X-rays are incident (FIG. 7B), the X-ray linear sensor 14 is moved in the direction in which the X-ray linear sensor 14 separates from the analyzing crystal 13. Consequently, the interval between the two detection elements 141 on which the two characteristic X-rays are incident can be corrected as designed. In addition, the two characteristic X-rays are incident on the predetermined detection elements 141A0, 141B0 by moving the X-ray linear sensor 14 in the direction in which the detection elements 141 are arranged (FIG. 7C). Thus, the calibration of the energy of the characteristic X-ray detected by each detection element is completed.

In this case, the calibration is performed using the two characteristic X-rays having the known energies emitted from the standard sample. When the energies of at least three characteristic X-rays emitted from the standard sample are known, the calibration can be performed with higher accuracy using the at least three characteristic X-rays.

In this case, the calibration is performed by moving the X-ray linear sensor 14. Alternatively, the value of the energy allocated to each detection element 141 may be changed while the position of the X-ray linear sensor 14 is fixed. Specifically, the energy of the detected characteristic X-ray is assigned to the detection element 141 that detects two (or more) characteristic X-rays as a detection value of the energy in the detection element 141. The energy of the detected characteristic X-ray may be assigned to other detection elements 141 using an equation (3)' of the new calibration curve obtained by correcting the values of L and n (or L, n, and $\theta_M$) based on the energies of the two characteristic X-rays and the equation (3). For example, each detection element 141 can be calibrated using the equation (3)' of the new calibration curve. In the equation (3)', the value of L in the equation (3) is replaced with "L+a", the value of n in the equation (3) is replaced with "n+b", and the value of $\theta_M$ in the equation (3) is replaced with "$\theta_M$+c"

(2-4) Example of Standard Samples Used

Figure 8:
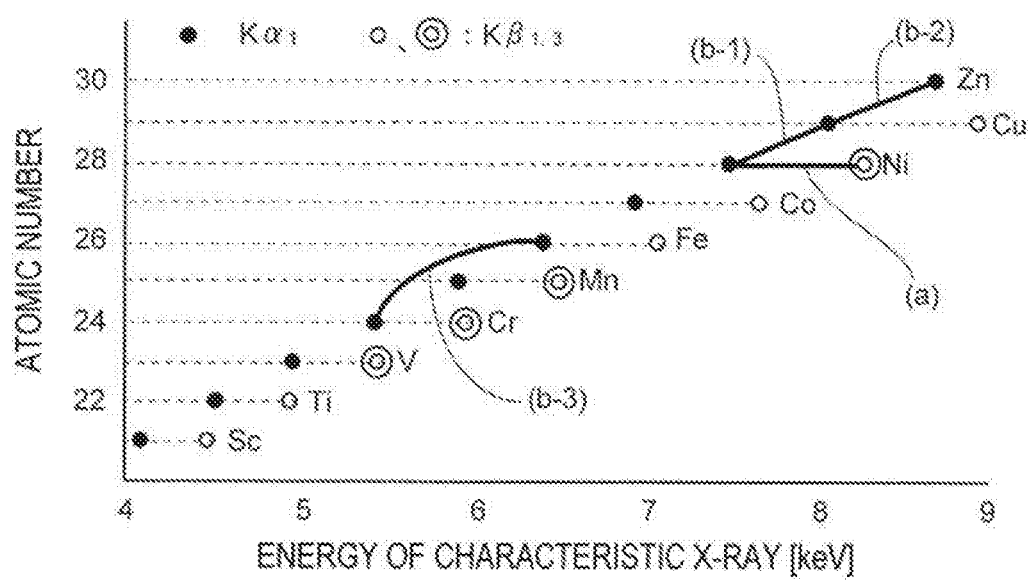
FIG. 8 is a view illustrating examples of an element contained in a standard sample used for energy calibration and the characteristic X-ray of the contained element.

Examples of the element contained in the standard sample used for the energy calibration and the characteristic X-rays of the contained elements will be described with reference to FIG. 8. FIG. 8 illustrates the energies of $K\alpha_1$ ray (a black circle in FIG. 8) and $K\beta_{1,3}$ ray (a white circle and a double circle in FIG. 8) emitted by the irradiation of the excitation ray with respect to Sc (scandium), Ti (titanium), V (vanadium). Cr, Mn, Fe, Co (cobalt), Ni (nickel), Cu (copper) and Zn (zinc) that are 3d transition metals. The double circle in FIG. 8 is an example of the element contained in the sample of the measurement target. Any standard sample in which at least two kinds of characteristic X-rays having known energies are incident on the X-ray linear sensor 14 may be used as the standard sample, but desirably the following standard sample is used.

A first example of the desirable standard sample is the case where the energies of $K\alpha_1$ and $K\beta_{1,3}$ rays emitted from the same element contained in the standard sample are known. In FIG. 8, a thick line to which a symbol (a) is added indicates $K\alpha_1$ and $K\beta_{1,3}$ rays of Ni. After calibration is performed using the two characteristic X-rays emitted from the standard sample, $K\beta_{1,3}$ ray of Ni, that is the same element as that used in the calibration is measured in the sample of the measurement target. Ni is only by way of example. When other elements are the element of the measurement target, after the calibrating is performed using $K\alpha_1$ and $K\beta_{1,3}$ rays of the element emitted from the standard sample, $K\beta_{1,3}$ ray of the element may be measured in the sample of the measurement target.

A second example of the desirable standard sample is the case where the energies of $K\alpha_1$ rays emitted from the two (or more) elements contained in the standard sample are known. In FIG. 8, the thick line to which a symbol (b-1) is added indicates $K\alpha$ ray of Ni and $K\alpha_1$ ray of Cu. After calibration is performed using the two characteristic X-rays emitted from the standard sample, $K\beta_{1,3}$ ray of Ni, that is the same element as that used in the calibration is measured in the sample of the measurement target. $K\alpha_1$ ray of Cu and $K\alpha_1$ ray of Zn that have the energy close to $K\beta_{1,3}$ ray of Ni of the measurement target may be used as indicated by a symbol (b-2) in FIG. 8. Alternatively, as indicated by a symbol (b-3) in FIG. 8, the energy is calibrated using $K\alpha_1$ ray of Cr and $K\alpha_1$ ray of Fe in which the atomic numbers are away from each other, and $K\beta_{1,3}$ ray of Cr may be measured. For the symbol (b-3), in addition to $K\beta_{1,3}$ ray of Cr, $K\beta_{1,3}$ ray of V or Mn in which the energy is close to $K\alpha_1$ ray of Cr and $K\alpha_1$ ray of Fe can be used as the measurement target. In any case, the calibration can accurately be performed using $K\alpha_1$ ray having large intensity detected by the detection element 141.

(2-5) Fitting of Detected Characteristic X-Ray

Figure 9:
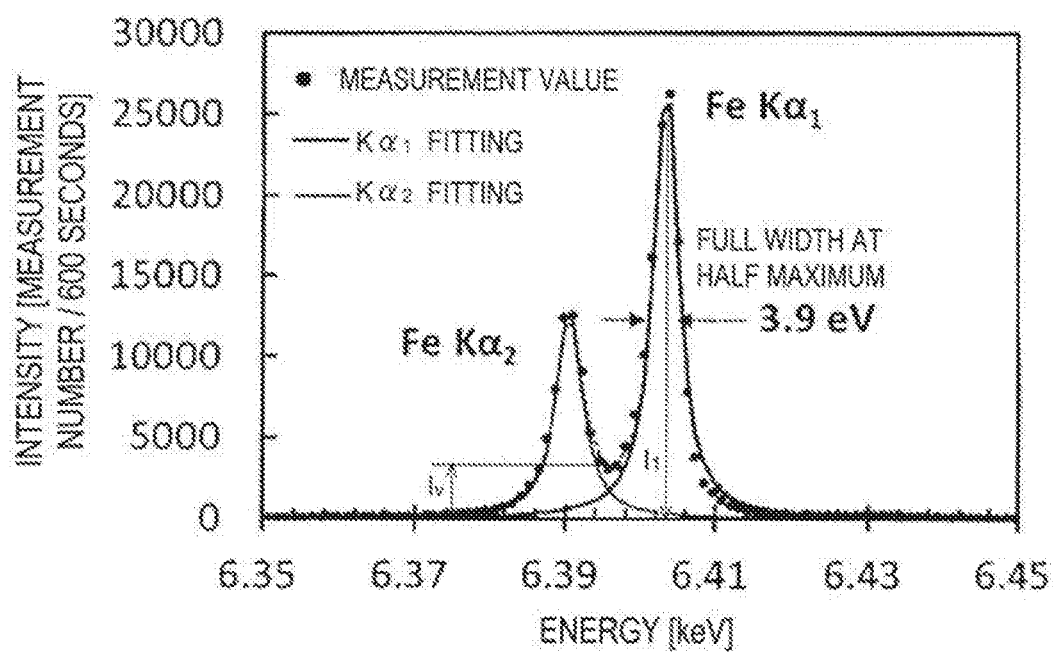
FIG. 9 is a graph illustrating a result of fitting an energy spectrum of Kα ray of Fe with a Lorentz function.
Figure 10:
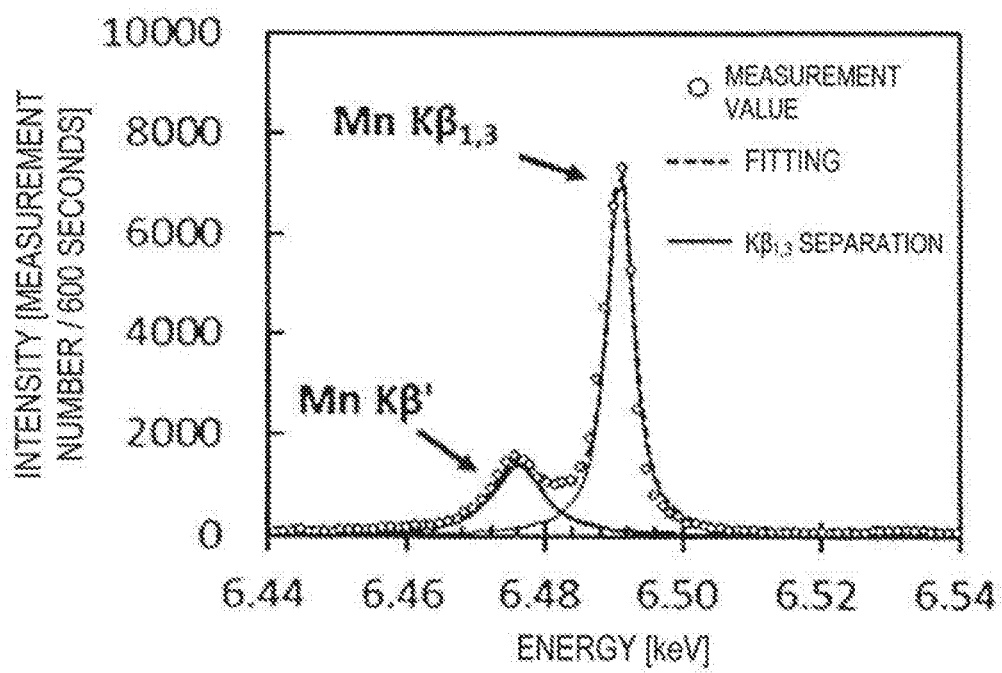
FIG. 10 is a graph illustrating a result of fitting an energy spectrum of Kβ ray of Mn with the Lorentz function.

The energy at the peak of the characteristic X-ray can accurately be obtained by fitting the energy spectrum of the characteristic X-ray that is emitted from the standard sample and detected by the X-ray linear sensor 14 using the Lorentz function, and the energy of the characteristic X-ray detected by each detection element 141 can accurately be calibrated using the energy. FIG. 9 illustrates the results of the fitting with the Lorentz function for $K\alpha$ ray of Fe, and FIG. 10 illustrates the results of the fitting for $K\beta$ ray of Mn. In FIG. 9, the fitting is performed as superposition of the Lorentz function of $K\alpha_1$ ray and the Lorentz function of $K\alpha_2$ ray, and the energy at the peak of $K\alpha_1$ ray is determined. An intensity $I_v$ at the valley formed between the peak of $K\alpha$ ray and the peak of $K\alpha_2$ ray is less than or equal to ½ of an intensity II at the peak of $K\alpha_1$ ray. In this example, $K\alpha_1$ ray and $K\alpha_2$ ray can clearly be separated from each other. When the intensity $I_v$ of the valley does not become ½ of the intensity II at the peak of $K\alpha$ ray because of the X-ray spectrometer having the poor energy resolution, the peak energy of $K\alpha_1$ ray can hardly be determined with high accuracy. In FIG. 10, the fitting is performed as the superposition of the Lorentz function of $K\alpha_{1,3}$ ray and the Lorentz function of $K\beta'$ ray, and the energy at the peak of $K\alpha_{1,3}$ ray is determined.

In this case, the energy spectrum of the characteristic X-ray that is emitted from the standard sample and used for the energy calibration of the detection element 141 is fitted using the Lorentz function. Alternatively, the energy spectrum of the characteristic X-rays emitted from the sample of the measurement target may be fitted with the Lorentz function. Consequently, the chemical state such as the valence of the element contained in the sample of the measurement target can accurately be analyzed.

(2-6) Creation of Standard Curve

Figure 11:
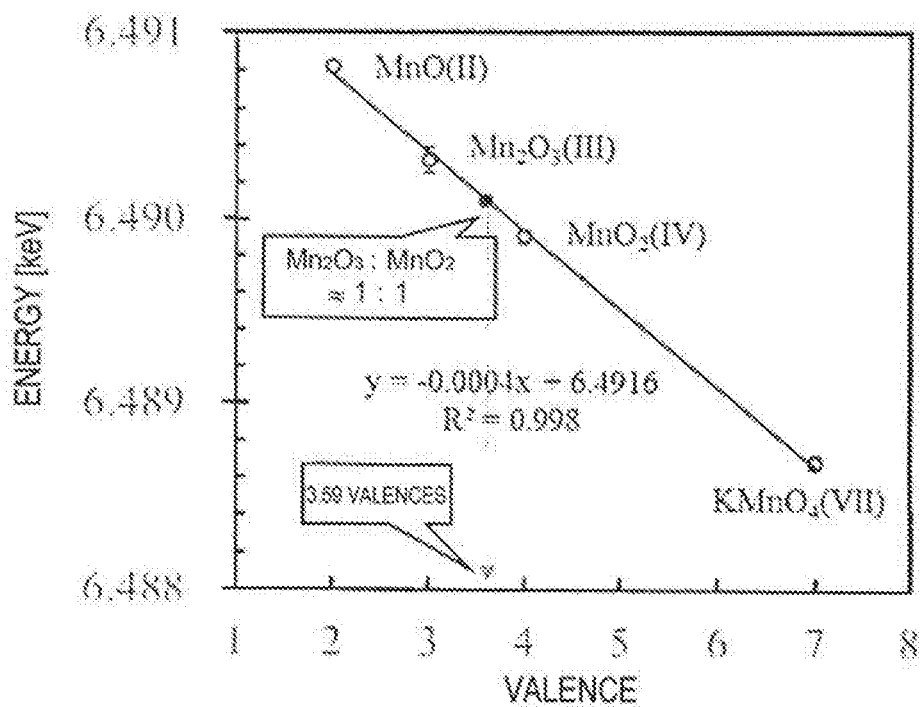
FIG. 11 is a graph illustrating a standard curve representing a relationship between the valence and the characteristic X-ray energy for Mn.

The X-ray spectrometer 10 of the first embodiment may include a standard curve creation unit 17 (see FIG. 1) in addition to the above components. The standard curve creation unit 17 creates a standard curve indicating the peak energy with respect to the valence based on the peak energies of the characteristic X-rays emitted from the plurality of standard samples having the known contained elements and the known valences of the known contained elements, the known valences being different from each other. For example, as illustrated in FIG. 11, the target element is set to Mn, and MnO (+2 valences), $Mn_2O_3$ (+3 valences), $MnO_2$ (+4 valences), and $KMoO_4$ (+7 valences) are used as the standard sample to measure the energy of $K\beta_{1,3}$ ray emitted from each of the standard samples. The standard curve in FIG. 11 is created by expressing the relationship between the energy obtained by the measurement and the valence using a linear function.

Subsequently, the sample in which $Mn_2O_3$ and $MnO_2$ are mixed such that a ratio of the number of Mn atoms becomes about 1:1 is measured with the X-ray spectrometer 10, and a valence value of "3.59 valences" is obtained when the value of the energy of the obtained $K\beta_{1,3}$ ray is applied to the standard curve in FIG. 11. The valence is an average valence of Mn in the sample.

(2-7) X-Ray Spectrometer of First Modification of First Embodiment

Figure 12:
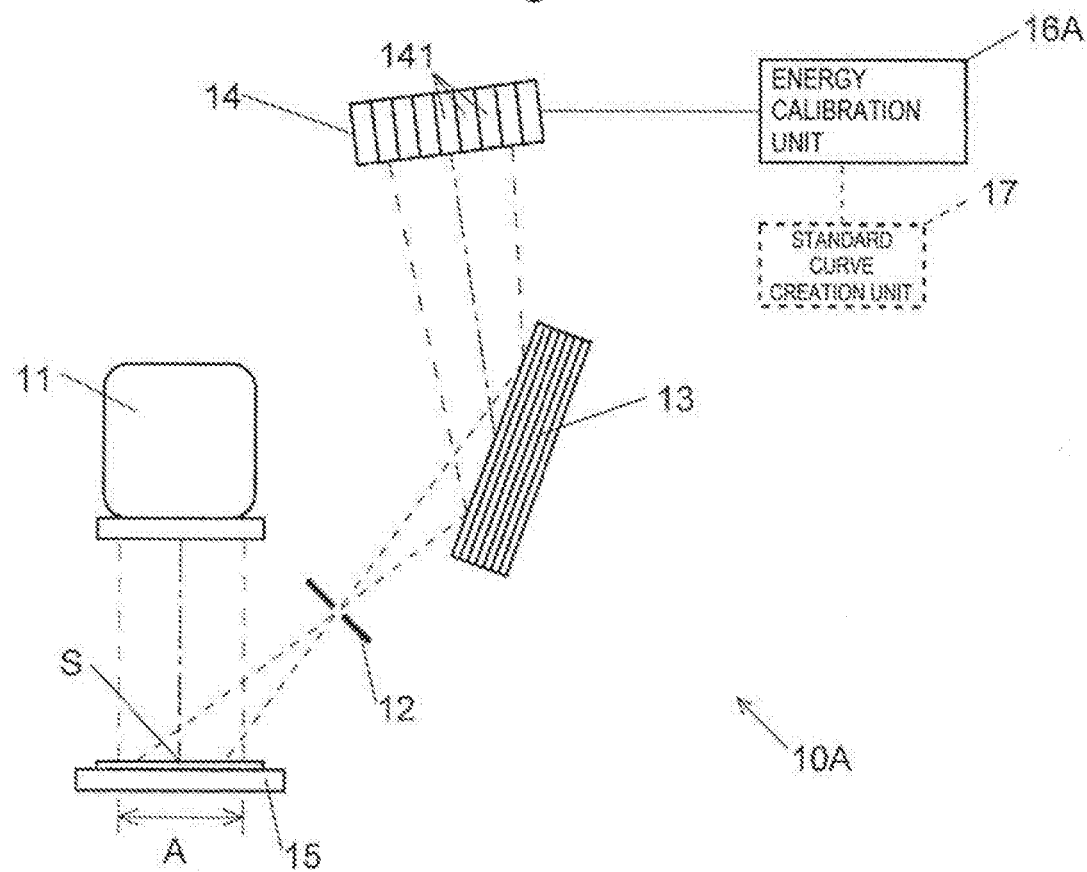
FIG. 12 is a schematic side view illustrating a configuration of a first modification of the first embodiment.

FIG. 12 illustrates a schematic configuration of an X-ray spectrometer 10A according to a first modification of the first embodiment. The X-ray spectrometer 10A includes an energy calibration unit 16A embodied by hardware and software such as a CPU of a computer instead of the X-ray linear sensor position fine adjustment unit 161 and controller 162.

In the X-ray spectrometer 10A of the first modification, the energy calibration unit 16A obtains the optical path length between the reference detection element of the X-ray linear sensor 14 and the slit 12 and the inclination angle of the analyzing crystal 13 by a least square method based on the energies of at least three characteristic X-rays generated by the standard sample, thereby obtaining the energy of the three characteristic X-ray detected by each detection element of the X-ray linear sensor 14. At this point, the detection element 141M in the center of the X-ray linear sensor 14 is used as the reference detection element. Consequently, the distance L corresponds to the distance between the reference detection element of the X-ray linear sensor 14 and the slit 12, and the diffraction angle $\theta_M$ corresponds to the inclination angle of the analyzing crystal 13. Thus, the distance L and the diffraction angle $\theta_M$ are obtained based on the equation (3) or the following formula (4) in which the wavelength $\lambda_x$ in the equation (3) is rewritten to energy Ex.

[Mathematical formula 4]

$$E_X = k * \frac{\sqrt{X^2 + L^2}}{L \cdot \sin \theta_M - X \cdot \cos \theta_M} \quad (4)$$

At this point, when the energy Ex is expressed in units of electron volts (eV), a coefficient k in the equation (4) is expressed as follows.

$k=(hc)/(2de)$ where h is a Planck constant, c is the light speed, d is a crystal plane interval of the analyzing crystal 13, and e is an elementary charge.

In the example, Fe and Cr are used as the standard samples, and the energies of the four characteristic X-rays, namely, $K\alpha_1$ ray of Fe, $K\alpha_2$ ray of Fe, $K\alpha_1$ ray of Cr, and $K\alpha_2$ ray of Cr are detected by the X-ray linear sensor 14 of the X-ray spectrometer 10. Table 1 illustrates the energy of each characteristic X-ray and the channel number of the detection element that detected each characteristic X-ray. The channel number is a number in which in the detection elements 141 located at both ends of the X-ray linear sensor 14, the detection element on which the X-ray having the lower energy (the long wavelength, the large diffraction angle at the analyzing crystal 13) are incident is set to number one, and an integer number is assigned to each detection element 141 in the order in which the detection elements 141 are arranged in the X-ray linear sensors 14. However, because one characteristic X-ray is incident over the plurality of detection elements, it is assumed that the detection intensities of the plurality of detection elements follow a Gaussian distribution, and the position corresponding to the peak of the Gaussian distribution is represented by a decimal channel number.

TABLE 1

| Characteristic X-ray | Energies [eV] | Channel number |
|---|---|---|
| Fe•$K\alpha_1$ | 6403.90 | 1081.53 |
| Fe•$K\alpha_2$ | 6390.90 | 1070.53 |
| Cr•$K\alpha_1$ | 5414.70 | 44.34 |
| Cr•$K\alpha_2$ | 5405.50 | 32.61 |

The energies and the channel number (corresponding to the distance X from the center of the X-ray linear sensor 14 as described above) of the four characteristic X-rays are applied to the equation (4), and the distance L and the diffraction angle $\theta_M$ are calculated by the least square method. Consequently, L=0.4970 m and $\theta_M$=31.49° are obtained. An average energy error at each detection element 141 is 0.09 eV in terms of root mean square (rms).

Figure 13:
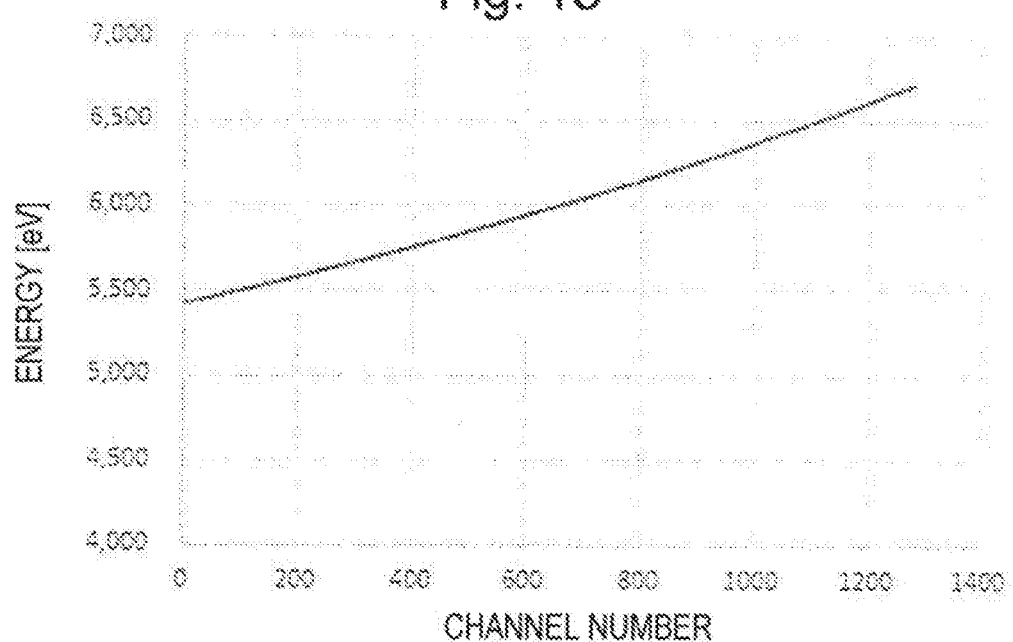
FIG. 13 is a graph illustrating a relationship between a channel number of the detection element and energy obtained by a least square method in a first modification.

FIG. 13 illustrates a curve in which the distance L and the diffraction angle $\theta_M$ obtained by the least square method are applied to the equation (4) to represent the energy by a function using the channel number as a variable. From the curve, the energy of the characteristic X-ray detected by the detection element 141 of each channel number can be determined (calibrated).

In the X-ray spectrometer 10A of the first modification, after the energy of the characteristic X-ray detected by each detection element 141 is calibrated as described above, the standard curve creation unit 17 can create the standard curve similarly to the X-ray spectrometer 10 of the first embodiment.

In the first modification, the energies of the four characteristic X-rays are used for the calibration. Alternatively, even when the number of energies of the characteristic X-rays is three or at least five, similarly to the first modification, the distance L and the diffraction angle $\theta_M$ are obtained by the least square method, and the wavelength or energy of the characteristic X-ray detected by each detection element 141 can be determined (calibrated) using the equation (3) or (4). In the first modification, the standard sample having two kinds of elements, namely, Fe and Cr is used. Alternatively, as long as at least three characteristic X-rays can be generated, the standard sample may contain only one kind of element or at least three kinds of elements.

(2-8) X-Ray Spectrometer of Second Modification of First Embodiment

Figure 14A:
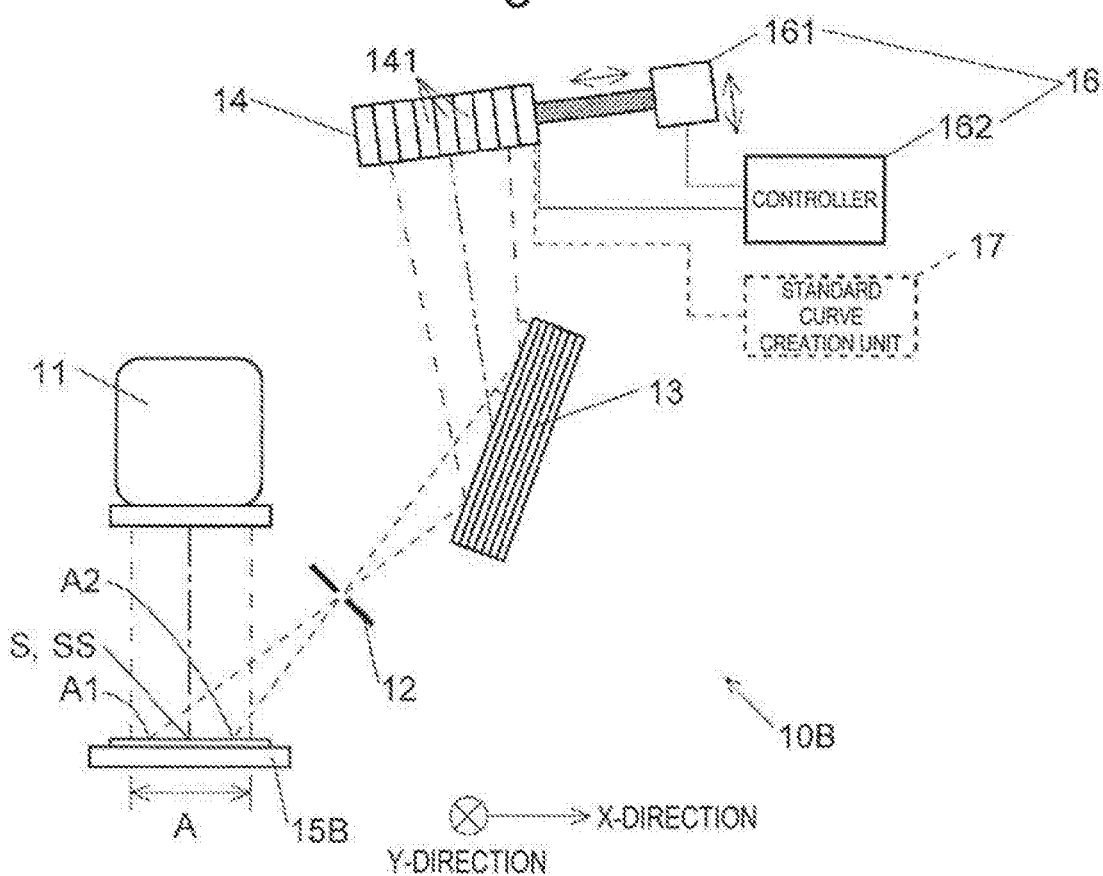
FIG. 14A is a schematic side view illustrating a configuration of a second modification of the first embodiment.
Figure 14B:
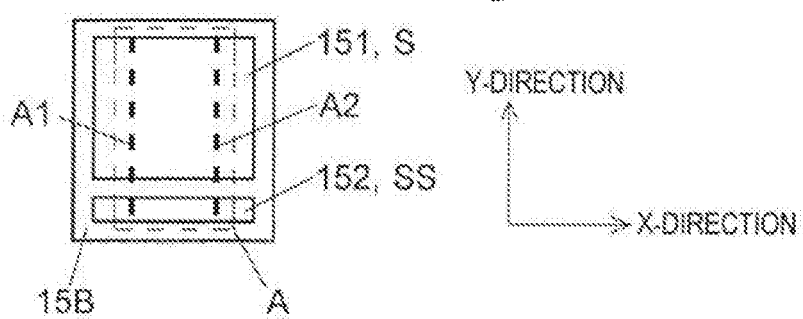
FIG. 14B is a top view illustrating a sample holder.

FIGS. 14A and 14B illustrate a schematic configuration of an X-ray spectrometer 10B according to a second modification of the first embodiment. In the second modification, a sample holder 15B includes a measurement sample holder 151 that holds the sample S of the measurement target and a standard sample holder 152 that holds a standard sample SS. Each of the ranges in which the measurement sample holder 151 and the standard sample holder 152 are provided includes the irradiation region A irradiated with the excitation light from the excitation source 11. Each of the measurement sample holder 151 and the standard sample holder 152 has a width in a direction (an X-direction in FIGS. 14A and 14B) perpendicular to the direction in which the slit 12 extends (a Y-direction in FIGS. 14A and 14B). The configuration of the X-ray spectrometer 10B except for the sample holder 15B is the same as that of the X-ray spectrometer 10.

In the X-ray spectrometer 10B of the second modification, the sample S of the measurement target is held by the measurement sample holder 151, and the standard sample SS that includes the element assumed not to be contained in the sample S and generates at least two characteristics X-rays is held by the standard sample holder 152. At this point, the sample S and the standard sample SS are irradiated with the excitation beam from the excitation source 11. Consequently, both the characteristic X-ray generated in the sample S and the characteristic X-ray generated in the standard sample SS pass through the slits 12 corresponding to the energies of the characteristic X-rays from the linear regions (A1, A2 in FIGS. 14A and 14B) extending in the Y-direction on the sample holder 15B, diffracted by the analyzing crystal 13, and detected by the detection elements 141 in the X-ray linear sensor 14.

The controller 162 controls the X-ray linear sensor position fine adjustment unit 161 to move the X-ray linear sensor 14 such that the two characteristic X-rays are incident on the predetermined detection elements 141 based on a detection signal of the detection element 141 or a detection element 141 in the vicinity of the detection element 141 that is previously determined corresponding to each of the energies of the at least two characteristic X-rays generated in the standard sample SS. Consequently, the energy of the characteristic X-ray detected by each detection element 141 is calibrated. On the other hand, the detection signals except for those corresponding to the energy of the characteristic X-ray generated by the standard sample SS are detected as the characteristic X-ray generated by the sample S of the measurement target, and used for the analysis of the sample S.

In the X-ray spectrometer 10B of the second modification, the characteristic X-ray of the standard sample SS can be measured at the same time as the characteristic X-rays of the sample S, so that the energy can be calibrated at any time during the measurement of the sample S. For this reason, for example, even when the chassis (not illustrated in FIGS. 14A and 14B) that accommodates each component of the X-ray spectrometer 10B expands or contracts due to the change in the currently-measured temperature of the analyzing crystal 13 or the X-ray linear sensor 14 of the X-ray spectrometer 10B, the energy can immediately be calibrated to perform the accurate measurement.

In the X-ray spectrometer 10B of the second modification, similarly the standard curve can be created by the standard curve creation unit 17 after the energy of the characteristic X-ray is calibrated.

(3) X-Ray Spectrometer of Second Embodiment

Figure 15:
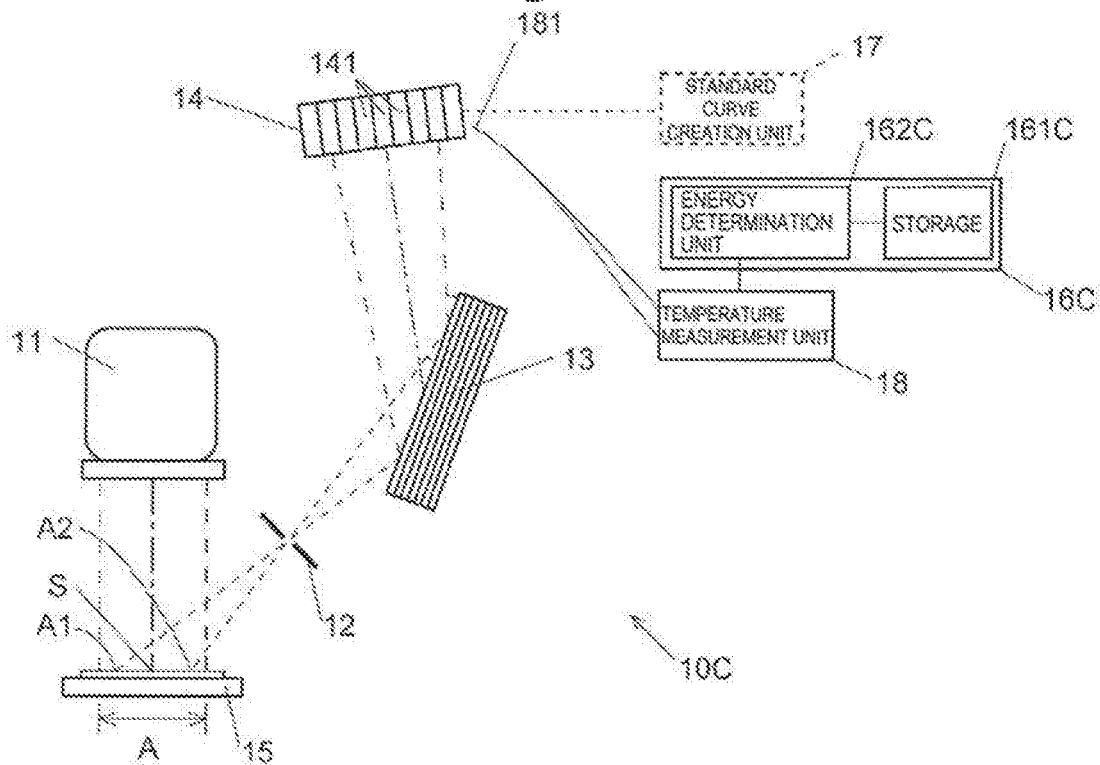
FIG. 15 is a schematic side view illustrating a configuration according to a second embodiment.

FIG. 15 illustrates a schematic configuration of an X-ray spectrometer 10C according to a second embodiment. The X-ray spectrometer 10C includes an energy calibration unit 16C embodied by hardware and software such as a CPU of a computer instead of the X-ray linear sensor position fine adjustment unit 161 and a temperature measurement unit 18 instead of the X-ray linear sensor position fine adjustment unit 161 and controller 162 in the X-ray spectrometer 10 of the first embodiment. Other calibrations are the same as those of the X-ray spectrometer 10 of the first embodiment. A difference point from the X-ray spectrometer 10 of the first embodiment will be described below.

The temperature measurement unit 18 measures a temperature at a predetermined position in the X-ray spectrometer 10C. FIG. 15 illustrates an example in which the temperature sensor 181 is provided close to the X-ray linear sensor 14. Alternatively, the temperature sensor 181 may be brought into contact with a position except for the X-ray incidence surface of the X-ray linear sensor 14. Alternatively, the temperature sensor 181 may be provided close to the analyzing crystal 13, or brought into contact with at a position except for the X-ray incident surface in the analyzing crystal 13. Further, each element of the X-ray spectrometer 10C may be fixed to a wall of a chassis (not illustrated), and the temperature sensor 181 may be provided close to the wall of the chassis, or contact with the wall of the chassis.

The energy calibration unit 16C includes a storage 161C that stores a table of data in which the value of the energy detected by each detection element 141 of the X-ray linear sensor 14 is recorded for the cases of different temperatures measured by the temperature sensor 181, and an energy determination unit 162C that determines the value of the energy detected by each detection element 141 based on the temperature measured by the temperature sensor 181 during the energy calibration and the data in the table.

The at least two characteristic X-rays having the known energies are previously measured by the X-ray linear sensor 14 at a plurality of temperatures, whereby the data stored in the storage 161C is acquired by obtaining the value of the energy detected by each detection element 141. At this point, because the energy value is obtained only at a plurality of discrete temperatures in the table of the storage 161C, the energy determination unit 162C obtains the energy value at the measurement temperature by performing interpolation using two closest temperatures in the table above and below the temperature (measured temperature) measured by the temperature sensor 181 during the energy calibration and the energy values corresponding to the two temperatures.

In the X-ray spectrometer 10C of the second embodiment, when the characteristic X-ray generated in the sample S of the measurement target is detected, the temperature measurement unit 18 measures the temperature at the predetermined position, and based on the temperature, the energy calibration unit 16C calibrates the energy at any time by determining the value of the energy detected by each detection element 141, so that the energy of the characteristic X-ray generated in the sample S of the measurement target can be correctly determined even when the value of the energy detected by each detection element 141 in association with the expansion or the contraction due to the temperature change.

In the X-ray spectrometer 10C of the second embodiment, it is not necessary to use the standard sample for the energy calibration.

The storage 161C stores the relationship between the temperature and the energy value for each detection element 141 as the table. Alternatively, a function indicating the relationship between the temperature and the energy value for each detection element 141 is stored in the storage 161C, and the energy value may be obtained for each detection element 141 by applying the temperature measured by the temperature sensor 181 to the function in the energy calibration unit 16C.

Although the X-ray spectrometer of the first embodiment of the present invention and the modifications of the first embodiment, the X-ray spectrometer of the second embodiment, and the chemical state analysis method of the embodiment using the X-ray spectrometers are described above, the present invention is not limited to these embodiments, and various modifications can be made.

REFERENCE SIGNS LIST 10, 10A, 10B, 10C, 90 . . . X-ray Spectrometer
11, 91 . . . Excitation Source
12, 92 . . . Slit
13, 93 . . . Analyzing crystal
14, 94 . . . X-ray Linear Sensor
141, 1411, 1412, 141L, 141M, 141X, 141A0, 141B0, 141A1, 141B1, 141A2, 141B2, 941 . . . Detection Element
15, 15B . . . Sample Holder
151 . . . Measurement Sample Holder
152 . . . Standard Sample Holder
16, 16A, 16C . . . Energy Calibration Unit
161 . . . X-ray Linear Sensor Position Fine Adjuster
161C . . . Storage
162 . . . Controller
162C . . . Energy determination unit
17 . . . Standard Curve Creation Unit 18 . . . Temperature Measurement Unit
181 . . . Temperature Sensor
A . . . Irradiation Region
A1, A2 . . . Linear Portion of Irradiation Region
S . . . Sample
SS . . . Standard Sample

The invention claimed is:

1. An X-ray spectrometer comprising:
a) a sample holder;
b) an excitation source configured to irradiate a predetermined irradiation region on a surface of a sample held by the sample holder with an excitation ray for generating a characteristic X-ray;
c) an analyzing crystal provided to face the irradiation region;
d) a slit provided between the irradiation region and the analyzing crystal, the slit being parallel to the irradiation region and a predetermined crystal plane of the analyzing crystal;
e) an X-ray linear sensor provided such that a plurality of linear detection elements each having a length in a direction parallel to the slit are arranged in a direction perpendicular to the slit; and
(f) an energy calibration unit configured to calibrate energy of the characteristic X-ray detected by each of the plurality of detection elements of the X-ray linear sensor at least based on known energies of $K\alpha_1$ ray and $K\beta_{1,3}$ ray emitted from one kind of element and measured by irradiating the irradiation region on a surface of a standard sample held by the sample holder with the excitation ray from the excitation source.

2. The X-ray spectrometer according to claim 1, wherein the analyzing crystal is made of a flat plate.

3. The X-ray spectrometer according to claim 1, wherein the one kind of element is an element contained in a sample of a measurement target.

4. The X-ray spectrometer according to claim 1, wherein the energy calibration unit determines peak energy of intensity of $K\alpha_1$ ray by fitting an intensity curve in which $K\alpha_1$ ray and $K\alpha_2$ ray detected by the X-ray linear sensor overlap with a Lorentz function of $K\alpha_1$ ray and a Lorentz function of $K\alpha_2$ ray.

5. The X-ray spectrometer according to claim 4, wherein the X-ray spectrometer has energy resolution in which intensity at a valley formed between a peak of $K\alpha_1$ ray and a peak of $K\alpha_2$ ray becomes less than or equal to ½ of the intensity at the peak of $K\alpha_1$ ray.

6. The X-ray spectrometer according to claim 1, wherein the energy calibration unit determines peak energy of intensity of $K\alpha_{1,3}$ ray by fitting an intensity curve in which $K\beta_{1,3}$ ray and $K\beta'$ ray detected by the X-ray linear sensor overlap with a Lorentz function of $K\beta_{1,3}$ ray and a Lorentz function of $K\beta'$ ray.

7. The X-ray spectrometer according to claim 1, further comprising a standard curve creation unit configured to create a standard curve indicating a relationship between peak energy and a valence based on peak energy of the characteristic X-rays emitted from a plurality of standard samples containing predetermined known elements and known different valences.

8. The X-ray spectrometer according to claim 1, wherein the energy calibration unit
obtains, by a least square method, an optical path length between a reference detection element which is one of the plurality of detection elements and the slit and an inclination angle of the analyzing crystal, the inclination angle being defined by a diffraction angle of the characteristic X-ray that is Bragg-reflected by the analyzing crystal through the slit and is incident on a reference detection element, based on known energies of at least three characteristic X-rays measured by irradiating the irradiation region on a surface of the standard sample held by the sample holder with the excitation ray from the excitation source, and
obtains the energy of the characteristic X-ray detected by each of the plurality of detection elements based on the optical path length, the inclination angle, and a distance between each of the plurality of detection elements of the X-ray linear sensor and the reference detection element.

9. The X-ray spectrometer according to claim 1, wherein the sample holder includes:
a measurement sample holder configured to hold a sample of a measurement target in a region including the irradiation region; and
a standard sample holder configured to hold the standard sample at a position except for the measurement sample holder and a position irradiated with the excitation ray and within a range having a width in a direction perpendicular to the slit.

10. An X-ray spectrometer comprising:
a sample holder;
an excitation source configured to irradiate a predetermined irradiation region on a surface of a sample held by the sample holder with an excitation ray for generating a characteristic X-ray;
an analyzing crystal provided to face the irradiation region;
a slit provided between the irradiation region and the analyzing crystal, the slit being parallel to the irradiation region and a predetermined crystal plane of the analyzing crystal;
an X-ray linear sensor provided such that a plurality of linear detection elements each having a length in a direction parallel to the slit are arranged in a direction perpendicular to the slit; and
an energy calibration unit configured to calibrate energy of the characteristic X-ray detected by each of the plurality of detection elements of the X-ray linear sensor at least based on known energies of $K\alpha_1$ rays emitted from two kinds of elements and measured by irradiating the irradiation region on a surface of a standard sample held by the sample holder with the excitation ray from the excitation source, wherein the two kinds of elements are an element contained in a sample of a measurement target and an element having an atomic number larger than the element contained in the sample of the measurement target by one, or an element having an atomic number larger than the element contained in the sample of the measurement target by one and another element having an atomic number larger than the element contained in the sample of the measurement target by two.

11. The X-ray spectrometer according to claim 10, wherein
the elements contained in the sample of the measurement target are two or more kinds of elements having consecutive atomic numbers, and
the two characteristic X-rays generated from the standard sample are $K\alpha_1$ ray of an element having an atomic number larger than the element having the largest atomic number in the two or more kinds of elements having consecutive atomic numbers by one and $K\alpha_1$ ray of one of the two or more kinds of elements having consecutive atomic numbers.

12. The X-ray spectrometer according to claim 10, wherein the energy calibration unit determines peak energy of intensity of $K\alpha_1$ ray by fitting an intensity curve in which $K\alpha_1$ ray and $K\alpha_2$ ray detected by the X-ray linear sensor overlap with a Lorentz function of $K\alpha_1$ ray and a Lorentz function of $K\alpha_2$ ray.

13. The X-ray spectrometer according to claim 12, wherein the X-ray spectrometer has energy resolution in which intensity at a valley formed between a peak of $K\alpha_1$ ray and a peak of $K\alpha_2$ ray becomes less than or equal to ½ of the intensity at the peak of $K\alpha_1$ ray.

14. A method for analyzing a chemical state of an element in a sample of a measurement target using an X-ray spectrometer comprising:
a sample holder;
an excitation source configured to irradiate a predetermined irradiation region on a surface of a sample held by the sample holder with an excitation ray for generating a characteristic X-ray;
an analyzing crystal provided to face the irradiation region;
a slit provided between the irradiation region and the analyzing crystal, the slit being parallel to the irradiation region and a predetermined crystal plane of the analyzing crystal;
an X-ray linear sensor provided such that a plurality of linear detection elements each having a length in a direction parallel to the slit are arranged in a direction perpendicular to the slit; and
an energy calibration unit configured to calibrate energy of the characteristic X-ray detected by each of the plurality of detection elements of the X-ray linear sensor at least based on known energies of $K\alpha_1$ ray and $K\beta_{1,3}$ ray emitted from one kind of element and measured by irradiating the irradiation region on a surface of a standard sample held by the sample holder with the excitation ray from the excitation source, the method comprising:
calibrating the energy of the characteristic X-ray detected by each of the plurality of detection elements of the X-ray linear sensor based on the energies of at least two characteristic X-rays having different energies generated by irradiating the surface of the standard sample held by the sample holder with the excitation ray from the excitation source; and
determining the chemical state of the element in the sample of the measurement target based on the energy of the characteristic X-rays generated by irradiating the surface of the sample of the measurement target held by the sample holder with the excitation ray from the excitation source.

15. The method according to claim 14, wherein a valence of the element in the sample of the measurement target is determined as the chemical state.

16. An X-ray spectrometer comprising:
a sample holder;
an excitation source configured to irradiate a predetermined irradiation region on a surface of a sample held by the sample holder with an excitation ray for generating a characteristic X-ray;
an analyzing crystal provided to face the irradiation region;
a slit provided between the irradiation region and the analyzing crystal, the slit being parallel to the irradiation region and a predetermined crystal plane of the analyzing crystal;
an X-ray linear sensor provided such that a plurality of linear detection elements each having a length in a direction parallel to the slit are arranged in a direction perpendicular to the slit; and
an energy calibration unit configured to calibrate energy of the characteristic X-ray detected by each of the plurality of detection elements of the X-ray linear sensor at least based on known energies of $K\beta_{1,3}$ rays emitted from two kinds of elements and measured by irradiating the irradiation region on a surface of a standard sample held by the sample holder with the excitation ray from the excitation source.

* * * * *